United States Patent
Choi et al.

(10) Patent No.: US 10,455,192 B2
(45) Date of Patent: Oct. 22, 2019

(54) METHOD AND APPARATUS FOR TRANSMITTING VIDEO DURING VOICE CALL

(71) Applicant: Samsung Electronics Co., Ltd., Suwon-si, Gyeonggi-do (KR)

(72) Inventors: Byeong-Woo Choi, Seongnam-si (KR); Yeongseong Yoon, Seoul (KR); Yuhyun Lee, Suwon-si (KR); Hyun-Sik Choi, Suwon-si (KR); Jingoo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/070,954

(22) PCT Filed: Jan. 17, 2017

(86) PCT No.: PCT/KR2017/000545
§ 371 (c)(1),
(2) Date: Jul. 18, 2018

(87) PCT Pub. No.: WO2017/126858
PCT Pub. Date: Jul. 27, 2017

(65) Prior Publication Data
US 2019/0037172 A1 Jan. 31, 2019

(30) Foreign Application Priority Data
Jan. 19, 2016 (KR) .......................... 10-2016-0006420

(51) Int. Cl.
*H04N 7/14* (2006.01)
*H04N 7/15* (2006.01)
(Continued)

(52) U.S. Cl.
CPC ............. *H04N 7/147* (2013.01); *H04L 51/10* (2013.01); *H04L 51/24* (2013.01);
(Continued)

(58) Field of Classification Search
CPC ....... H04N 7/14; H04N 7/147; H04W 36/365; H04W 4/50; H04W 38/03; H04W 4/16;
(Continued)

(56) References Cited

U.S. PATENT DOCUMENTS

2009/0143007 A1 6/2009 Terlizzi
2010/0149302 A1 6/2010 Malik
(Continued)

FOREIGN PATENT DOCUMENTS

JP 2013-143752 A 7/2013
KR 10-2006-0021044 A 3/2006
(Continued)

OTHER PUBLICATIONS

European Search Report dated Dec. 11, 2018; European Appln. No. 17741624.5-1230 / 3402185.

*Primary Examiner* — Melur Ramakrishnaiah
(74) *Attorney, Agent, or Firm* — Jefferson IP Law, LLP

(57) ABSTRACT

Various embodiments of the present invention relate to a method and an apparatus for transmitting a video while performing a voice call between electronic devices. According to various embodiments of the present invention, an electronic device comprises: a display; at least one communication circuit configured to establish wireless communication with an external device using at least one protocol; and a processor operatively coupled to the display and the at least one communication circuit, wherein the processor may be configured to display a user interface on the display, and the user interface comprises an indication of whether or not video communication with the external device is possible, to
(Continued)

establish a video call with the external device while displaying the user interface, to transmit, using the at least one communication circuit, a first signal for requesting whether or not the video communication is possible, to receive, using the at least one communication circuit, a second signal to indicate whether or not the video communication is possible, to adapt, in response to the second signal, the indication to indicate that the video communication with the external device is possible, to receive a user input for selecting the indication, and to initiate, in response to the user input, transmission of video data to the external device. Various embodiments are also possible.

20 Claims, 19 Drawing Sheets

(51) Int. Cl.
*H04W 4/16* (2009.01)
*H04L 29/06* (2006.01)
*H04M 3/56* (2006.01)
*H04L 12/58* (2006.01)
*H04M 1/725* (2006.01)

(52) U.S. Cl.
CPC .... *H04L 65/1083* (2013.01); *H04M 1/72555* (2013.01); *H04M 3/567* (2013.01); *H04W 4/16* (2013.01); *H04N 2007/145* (2013.01)

(58) Field of Classification Search
CPC . H04L 12/58; H04L 65/1083; H04M 3/42161
USPC .............................. 348/14.01–14.16; 370/331
See application file for complete search history.

(56) References Cited

U.S. PATENT DOCUMENTS

| | | | |
|---|---|---|---|
| 2011/0105179 A1* | 5/2011 | Tanabe | H04M 1/72533 455/556.1 |
| 2012/0170572 A1 | 7/2012 | Bareli et al. | |
| 2013/0003625 A1* | 1/2013 | Skog | H04W 88/02 370/310 |
| 2013/0290552 A1* | 10/2013 | Nyberg | H04L 65/1069 709/228 |
| 2014/0122726 A1 | 5/2014 | Jafry et al. | |
| 2014/0240440 A1 | 8/2014 | Seo et al. | |
| 2015/0049158 A1* | 2/2015 | Olatunji | H04W 36/365 348/14.02 |
| 2015/0049164 A1* | 2/2015 | Krishnamoorthy | H04N 7/147 348/14.11 |
| 2015/0222849 A1 | 8/2015 | Kang et al. | |

FOREIGN PATENT DOCUMENTS

| | | | |
|---|---|---|---|
| KR | 10-2009-008719 A | 1/2009 | |
| KR | 10-2012-0079010 A | 7/2012 | |
| KR | 10-2014-0029740 A | 3/2014 | |
| KR | 10-2014-0055929 A | 5/2014 | |
| KR | 10-2015-0009644 A | 1/2015 | |
| WO | WO-2015176746 A1 * | 11/2015 | ......... H04L 65/1016 |

* cited by examiner

METHOD AND APPARATUS FOR TRANSMITTING VIDEO DURING VOICE CALL

TECHNICAL FIELD

Various embodiments of the present disclosure relate to a method and an apparatus for transmitting an image between electronic devices while performing a voice call therebetween.

BACKGROUND ART

Recently, with the advancement of digital technology, various types of electronic devices, including mobile communication terminals, smart phones, tablet Personal Computers (PCs), Personal Digital Assistants (PDAs), electric organizers, notebooks, wearable devices, Internet-of-Things (IoT) devices, audible devices, and the like, have been widely used.

Recently, with the rapid spread of electronic devices, existing mobile communication services which are oriented to a simple voice call have been changed to a data communication service which is oriented to data communication, and various types of services have been proposed. For example, a user can view a web page through his/her electronic device on the Internet, or can install an application on his/her electronic device and can be provided anywhere with his/her desired services (e.g., image services (e.g., image sharing and video call services)) through his/her electronic device.

A conventional image sharing or video call service is mainly performed through a mobile communication network, and is mostly performed in such a manner that a user presses a separate video call button to perform a video call. However, the conventional image services are limited in that the conventional image services have to be provided through a mobile communication network through which a video call service is provided. Therefore, for example, while a voice call is performed through a mobile communication network, an image service such as a video call or image sharing cannot be simultaneously provided in parallel with the execution of the voice call.

DETAILED DESCRIPTION OF THE INVENTION

Technical Problem

Conventionally, an image service and a voice call service have to be separately performed, and thus, while a voice call is performed, an image service cannot be provided in parallel with the voice call service. For example, a voice call function and an image capturing and transmission function are typically separated from each other in an electronic device having a built-in camera. Accordingly, in order to capture an image and transmit the captured image to a counterpart, a user is inconvenienced in that he/she has to activate a camera when he/she is not performing a voice call and then the originator has to perform, in person, multiple procedures for capturing an image, and storing and transmitting the captured image.

Various embodiments may provide a method, an apparatus, and a system which enable an electronic device to provide an image service, such as an image sharing service or a video call service, while a voice call is performed by the electronic device.

Various embodiments may provide a method, an apparatus, and a system capable of increasing the stability of a communication connection for image transmission when a user transmits an image to a call counterpart while he/she performs a voice call.

Various embodiments may provide a method, an apparatus, and a system capable of: determining whether a user can perform data communication with a call counterpart with whom he/she performs a voice call; when he/she can perform the data communication, determining the quality of the data communication to be performed with the call counterpart; and determining a data communication connection scheme for image transmission while the voice call is performed, on the basis of a result of the determination.

Various embodiments may provide a method, an apparatus, and a system which enable an electronic device to simultaneously perform an image service-related function while a voice call is performed by the electronic device.

Various embodiments may provide a method, an apparatus, and a system which enable an electronic device to capture an image to be transmitted while a voice call is performed by the electronic device and transmit (share) the captured image to (with) a call counterpart even without a user's separate transmission control, and enable an electronic device of the call counterpart to display the image.

Technical Solution

In accordance with an aspect of the present disclosure, an electronic device is provided. The electronic device includes: a display; at least one communication circuit configured to establish wireless communication with an external electronic device by using at least one protocol; a processor electrically connected to the display and the at least one communication circuit; and a memory electrically connected to the processor, wherein the memory may store instructions that, when executed, cause the processor to: display a user interface on the display, wherein the user interface includes an indication of whether it is possible to perform video communication with the external electronic device; establish a video call with the external electronic device while displaying the user interface; transmit, using the at least one communication circuit, a first signal for requesting whether it is possible to perform the video communication; receive, using the at least one communication circuit, a second signal indicating whether it is possible to perform the video communication; activate, in response to the second signal, the indication indicating that it is possible to perform the video communication with the external electronic device; receive a user input for selecting the indication; and initiate, in response to the user input, transmission of video data to the external electronic device.

In accordance with another aspect of the present disclosure, an electronic device is provided. The electronic device includes: a camera; a display; a communication circuit; and a processor functionally connected to the camera, the display, and the communication circuit, wherein the processor may be configured to: perform a voice call with another electronic device via first communication; determine, in response to a service execution request during the voice call, whether a service connection is established, based at least in part on data communication quality and whether it is possible to perform data communication with the another electronic device via second communication; and when the service connection is determined to be established, display, on the display, an image acquired through the camera and transmit the acquired image to the another electronic device via the second communication.

In accordance with still another aspect of the present disclosure, an operating method of an electronic device is provided. The operating method may include: performing a voice call with another electronic device via first communication; determining, in response to a service execution request during the voice call, whether a service connection is established, based at least in part on data communication quality and whether it is possible to perform data communication with the another electronic device via second communication; and when the service connection is determined to be established, displaying, on a display, an image acquired through a camera, and transmitting the acquired image to the another electronic device via the second communication.

In order to solve the technical problem, various embodiments of the present disclosure may include a computer-readable recording medium having a program recorded thereon for performing the method by a processor.

Advantageous Effects

When an image captured by a camera is transmitted to or shared with a call counterpart while a voice call is performed, the electronic device and the operating method thereof, which are implemented to solve the above-mentioned technical problems, according to various embodiments can provide the image on the basis of a more stable connection. According to various embodiments, the electronic device can provide an image service, such as image sharing or video call, through a network (e.g., second communication) separate from a network (e.g., first communication) for a voice call.

Various embodiments enable a user to be provided with an image service while the user performs a voice call, and thus can improve the user's convenience and induce the user's interest. According to various embodiments, when a user desires to transmit data (e.g., an image) while performing a voice call, the user can activate a camera, capture an image, process the image, and transmit the image while the voice call is performed, by using a one-time user input (e.g., a button selection, a voice command input, or a gesture (motion) input using the electronic device) which is configured in the electronic device. Therefore, the user's access and convenience in the case of use of the electronic device can be improved.

MODE FOR CARRYING OUT THE INVENTION

Figure 1:
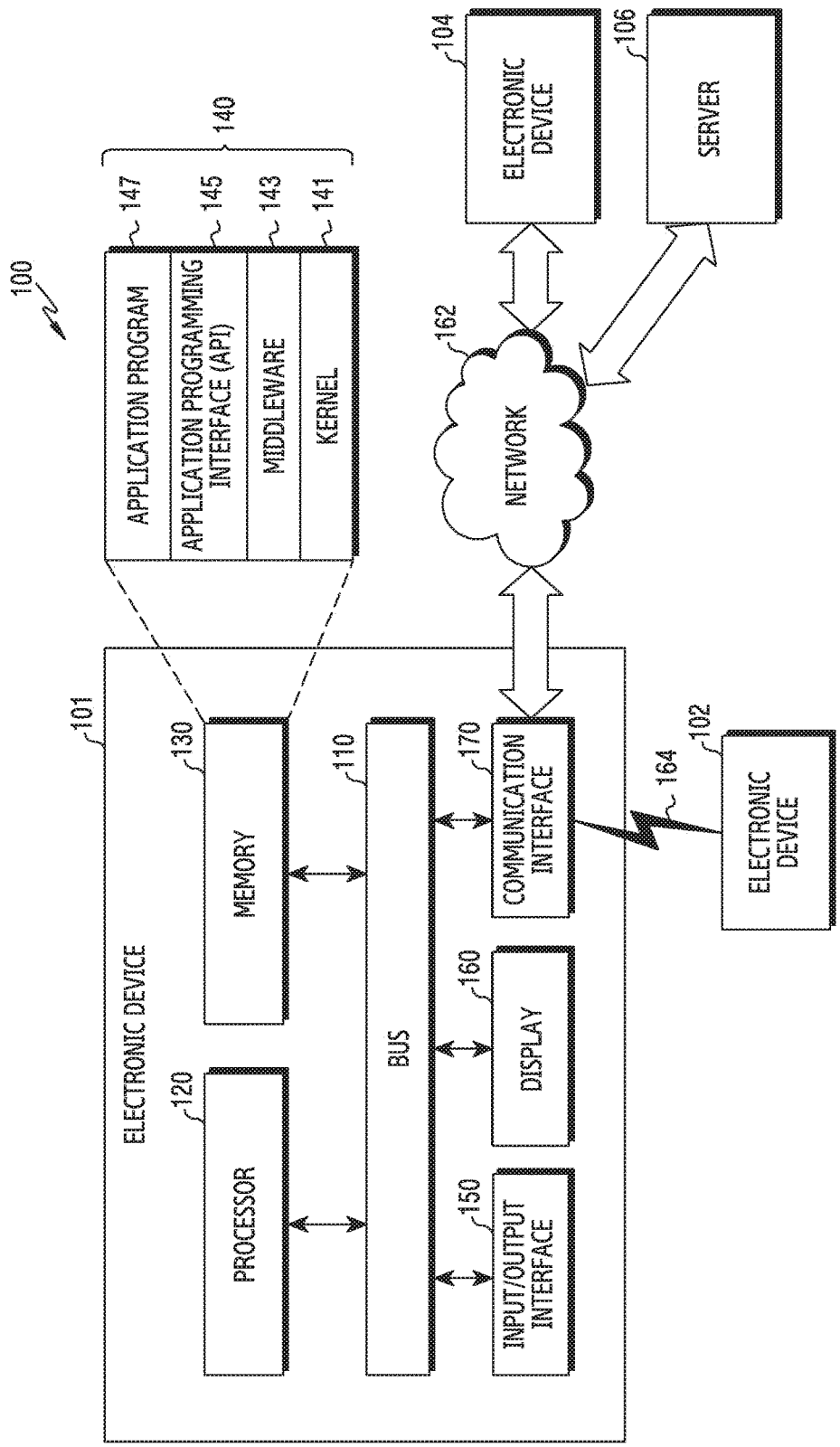
FIG. 1 is a view illustrating a network environment including an electronic device according to various embodiments.

Hereinafter, various embodiments of the present document are mentioned below with reference to the accompanying drawings. An embodiment and the terms used in this do not intend to limit the technology mentioned in the present document to a specific embodiment form, and should be construed as including various changes (or modifications) of the corresponding embodiment, equivalents thereof, and/or alternatives thereof. In the drawings, like reference symbols may denote like constituent elements.

As used in the present disclosure, the expression "have", "may have", "include", or "may include" refers to the existence of a corresponding feature (e.g., numeral, function, operation, or element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in the present disclosure may modify various elements regardless of the order and/or the importance, and is used only to distinguish one element from another element, but does not limit the corresponding elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there is no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of the art, and are not to be interpreted to have ideal or excessively formal meanings unless clearly defined in the present disclosure. In some cases, even the terms defined in the present disclosure should not be interpreted to exclude embodiments of the present disclosure.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit).

In some embodiments, the electronic device may be a home appliance. The home appliance may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices and may include a new electronic device according to technological advancement.

Hereinafter, with reference to the accompanying drawings, an electronic device according to various embodiments will be described. In the present document, the term 'user' may denote a person who uses the electronic device or a device (e.g., an artificial-intelligent electronic device) which uses the electronic device.

FIG. 1 is a block diagram of a network environment system according to an embodiment of the present disclosure.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element.

The bus 110 may, for example, include a circuit coupling the constituent elements 110, 120, 150, 160 and 170 with one another and forwarding communication (e.g., a control message or data) between the constituent elements.

The processor 120 may include one or more of a central processing unit (CPU), an application processor (AP) or a communication processor (CP). The processor 120 may, for example, execute operation or data processing for control and/or communication of at least one another constituent element of the electronic device 101. The processing (or control) operation of the processor 120 in accordance with various embodiments is specifically described with reference to the drawings described below.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The memory 130 may include a computer-readable recording medium having recorded thereon a program for causing the processor 120 to execute a method according to various embodiments.

The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141.

Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147. For example, the middleware 143 may perform scheduling or load balancing for the one or more work requests by processing the one or more work requests according to the priority order.

The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include short range communication (or local communication) 164. The short range communication (or local communication) 164 may, for example, include at least one of wireless fidelity (WiFi), Bluetooth (BT), near field communication (NFC), GNSS (global navigation satellite system), or the like. GNSS may, for example, comprise at least one of a global positioning system (GPS), a global navigation satellite system (Glonass), Beidou navigation satellite system (hereinafter, "Beidou")) or Galileo, the European global satellite-based navigation system, depending on the area or bandwidth used. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to one embodiment, the server 106 may include one or more groups of servers. According to various embodiments, all or some of operations executed in the electronic device 101 may be executed in another one electronic device or a plurality of electronic devices (e.g., the electronic devices 102 and 104 or the server 106). According to an embodiment, in case where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
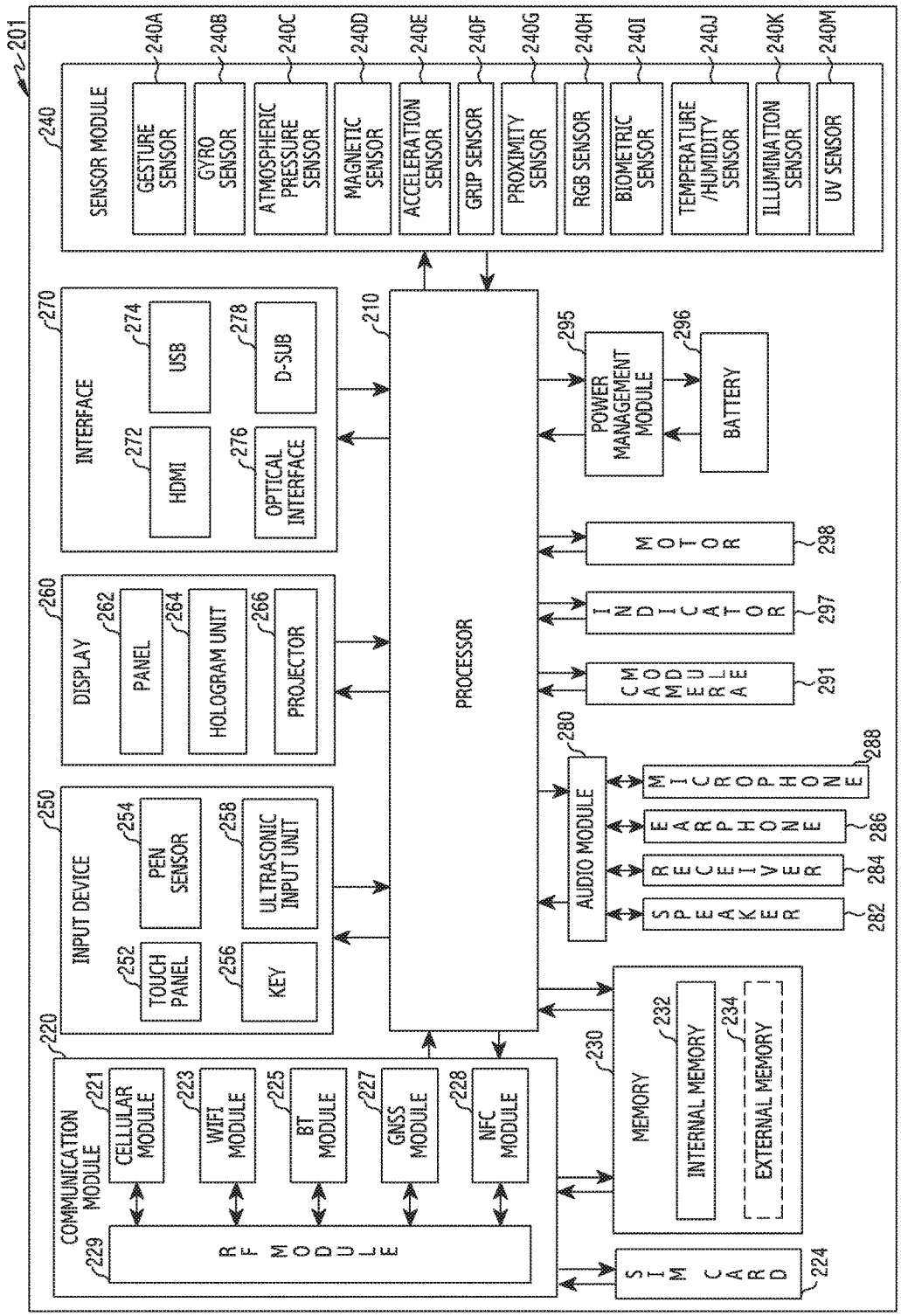
FIG. 2 is a view illustrating a block diagram of an electronic device according to various embodiments.

FIG. 2 is a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227 (e.g., GPS module, Glonass module, Beidou module, or Galileo module), a near field communication (NFC) module 228, and a radio frequency (RF) module 229.

The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP).

Each of the WiFi module 223, the Bluetooth module 225, the GNSS module 227, or the NFC module 228 may include, for example, a processor for processing data transmitted and received through a corresponding module. According to some embodiment, at least some (e.g., two or more) of the cellular module 221, the WiFi module 223, the Bluetooth module 225, the GNSS module 227 or the NFC module 228 may be included within one integrated chip (IC) or IC package.

The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module.

The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory (e.g., NAND flash or NOR flash, etc.), a hard drive or a solid state drive (SSD)).

The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user.

The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, or a projector 266. Panel 262 may include the same or similar configuration as display 160 of FIG. 1. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201. According to one embodiment, the display 260 may further include control circuitry for controlling the panel 262, the hologram device 264, or the projector 266.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like.

The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like).

The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), media-Flo™ or the like.

Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
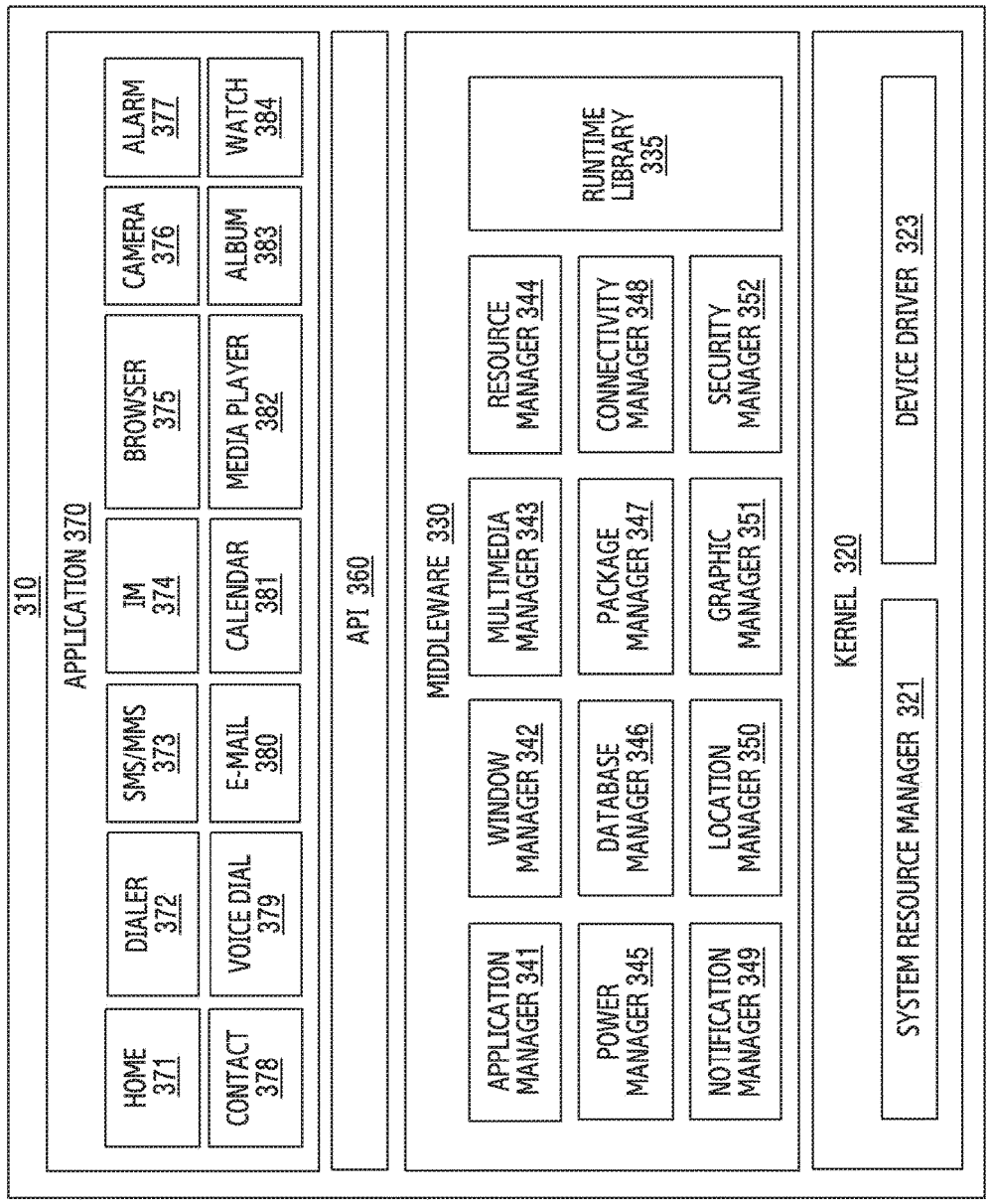
FIG. 3 is a view illustrating a block diagram of a program module according to various embodiments.

FIG. 3 is a block diagram of a program module according to an embodiment of the present disclosure.

Referring to FIG. 3, a program module 310 (e.g., the program 140) may include an Operating System (OS) for controlling resources related to an electronic device (e.g., the electronic device 101) and/or various applications (e.g., the application program 147) driven on the operating system. The operating system may, for example, include Android™, iOS™, Windows™, Symbian™, Tizen™ or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a WiFi driver, an audio driver or an inter-process communication (IPC) driver.

The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing.

The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory.

The power manager 345 may, for example, manage a battery capacity or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication.

According to an embodiment, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an operating system. The middleware 330 may dynamically delete some of the existing constituent elements or add new constituent elements.

The API 360 is, for example, a set of API programming functions, and may be provided to have another construction in accordance with the operating system. For example, Android or iOS may provide one API set by platform, and Tizen may provide two or more API sets by platform.

The application 370 may, for example, include a home 371, a dialer 372, a short message service (SMS)/multimedia messaging service (MIMS) 373, an instant message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application.

According to an embodiment, the application 370 may include an information exchange application that may support information exchange between an electronic device and an external electronic device. The information exchange application may, for example, include a notification relay application for relaying specific information to the external electronic device, or a device management application for managing the external electronic device.

For example, the notification relay application may relay notification information generated by another application of an electronic device to an external electronic device, or receive notification information from the external electronic device to provide the received notification information to a user.

The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device.

According to an embodiment, the application 370 may include an application (e.g., a health care application of a mobile medical instrument, auditory measurement application, audio playback application, etc.) designated according to an attribute of the external electronic device. According to an embodiment, the application 370 may include an application received from the external electronic device (e.g., electronic device 102, 104, or server 106). According to an embodiment, the application 370 may include a preloaded application or a third party application downloadable from a server. The names of the components of the program module 310 according to the illustrated embodiment may vary depending on the type of the operating system.

According to various embodiments, At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" used in the present document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in future, performing some operations.

At least a part of an apparatus (e.g., modules or functions thereof) or method (e.g., operations) according to various embodiments may, for example, be implemented by an instruction that is stored in a computer-readable storage media in the form of a program module. In case where the instruction is executed by a processor (e.g., the processor 120), the processor may perform a function corresponding to the instruction. The computer-readable recording media may be, for example, a memory 130.

The computer-readable recording media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include a code that is made by a compiler or a code that is executable by an interpreter. The hardware devices described above may be configured to operate as one or more software modules to perform the operations of various embodiments, and vice versa.

The module or program module according to various embodiments may include at least one or more of the aforementioned constituent elements, or omit some, or further include another constituent element. Operations carried out by the module, the program module or the another constituent element according to various embodiments may be executed in a sequential, parallel, repeated or heuristic manner, or at least some operations may be executed in different order or be omitted, or another operation may be added. And, example embodiments disclosed in the specification and drawings only suggest specific examples so as to easily explain the content of the present invention and help the understanding thereof, and are not to limit the scope of the present invention. Accordingly, the scope of the present invention should be construed as including all modified or changed forms that are drawn on the basis of the technological spirit of the present invention, in addition to the example embodiments disclosed herein.

In various proposed embodiments of the present disclosure, disclosed are a method and an apparatus which, while an electronic device performs a voice call, enable the electronic device to perform an image service, such as image sharing or video call, in parallel with the execution of the voice call. In various embodiments, disclosed are a method and an apparatus capable of, while a voice call is performed, establishing a data communication connection for an image service so as to more stably transmit data. In various embodiments, disclosed are a method and an apparatus capable of distinguishing a communication channel for a voice call from a communication channel for an image service so as to transmit an image while a voice call is performed.

An electronic device according to various embodiments of the present disclosure may support a communication function and/or a camera function, and may include all devices using one or more of various processors, including an Application Processor (AP), a Communication Processor (CP), a Graphic Processing Unit (GPU), a Central Processing Unit (CPU), and the like. Examples of the electronic device according to various embodiments may include all devices supporting a communication function and/or a camera function, such as information communication devices, multimedia devices, wearable devices, IoT devices, and audible devices, or may include application devices based on all the devices supporting the same.

Hereinafter, an operating method and an apparatus according to various embodiments of the present disclosure will be described with reference to the accompanying drawings. However, since various embodiments of the present disclosure are not restricted or limited by the following description, it should be noted that applications can be made to the various embodiments on the basis of the embodiments described below. Hereinafter, in various embodiments of the present disclosure, a hardware approach will be described by way of example. However, various embodiments of the present disclosure include technology which uses both hardware and software, and thus do not exclude a software-based approach.

Figure 4:
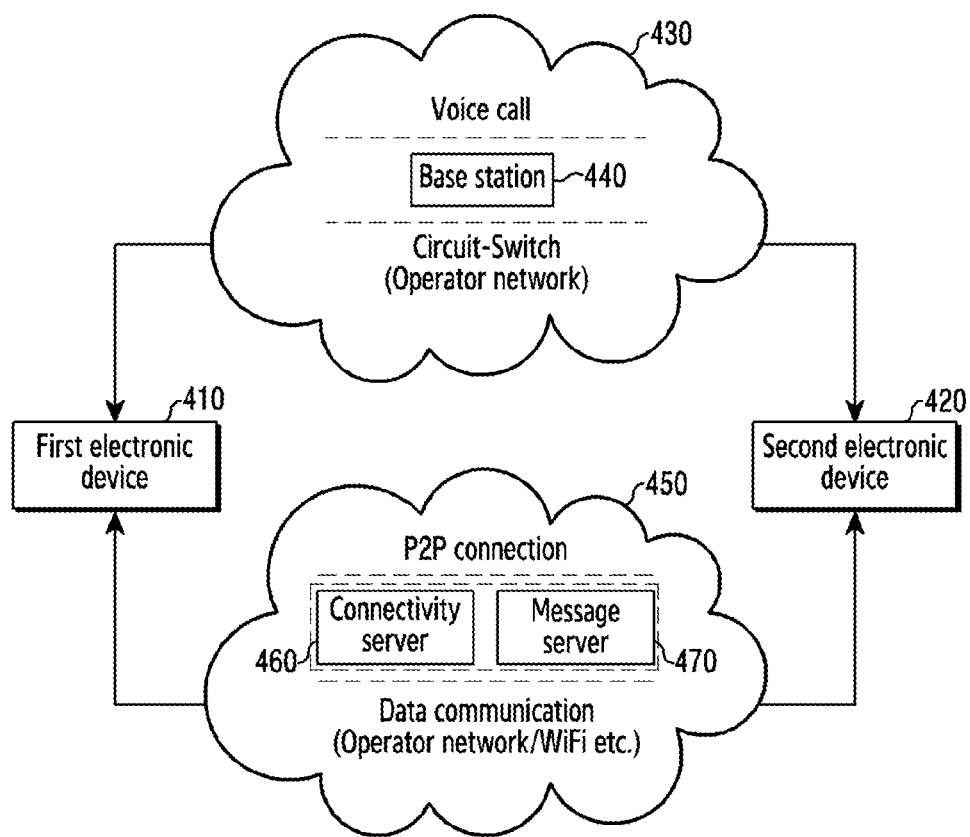
FIG. 4 is a view illustrated for explaining a system according to various embodiments of the present disclosure.

FIG. 4 is a view illustrated for explaining a system according to various embodiments of the present disclosure.

As illustrated in FIG. 4, the system according to various embodiments of the present disclosure may include electronic devices (e.g., first and second electronic devices 410 and 420), at least two networks 430 and 450, and one or more servers 460 and 470. According to various embodiments, the electronic devices may include the first electronic device 410 serving as a transmission-side and the second electronic device 420 serving as a reception-side. According to various embodiments, the networks may be divided into the first network 430 for first communication (e.g., a voice call) and the second network 450 for second communication (e.g., an image service). According to various embodiments, the first network 430 may be a mobile communication network (or a cellular network) for a mobile communication service, and may include a base station 440. According to various embodiments, the second network 450 may be a data communication network for a Peer-to-Peer (P2P) connection, and may include a connectivity server 460 and a message server 470.

Referring to FIG. 4, the first and second electronic devices 410 and 420 may perform a voice call therebetween through the first network 430, and may perform data communication with each other through the second network 450 (e.g., a Packet Switch (PS) network or Wi-Fi).

While the first electronic device 410 performs a voice call with the second electronic device 420, the first electronic device 410 may transmit an image captured by a camera to the second electronic device 420, and hereinafter, such a function will be referred to as an "image service". In various embodiments, a description is made of a configuration in which the first and second electronic devices 410 and 420 are connected to each other according to a P2P scheme and transmit/receive images to/from each other, but the present disclosure is not limited thereto. For example, in various embodiments, the first and second electronic devices 410 and 420 may transmit/receive images to/from each other according to a server-client scheme.

According to various embodiments, each of the electronic devices (e.g., the first and second electronic devices 410 and 420) may have a camera mounted on the inside or outside thereof. For example, each of the electronic devices may include an internal camera that is physically connected thereto or an external camera that is functionally connected thereto.

In various embodiments, images that the first and second electronic devices 410 and 420 transmit/receive to/from each other may include images, which are captured in real time by a camera, or stored (e.g., recorded) images. The stored images may refer to images stored in an internal or external element of each of the first and second electronic devices 410 and 420.

In various embodiments, examples of an operation of transmitting/receiving an image for an image service between electronic devices while a voice call is performed therebetween will be described in detail with reference to the following drawings.

A server may connect the first and second electronic devices 410 and 420 according to a P2P scheme, and may include one or more servers. In various embodiments, an example in which the server includes the connectivity server 460 and the message server 470 will be described.

In various embodiments, the connectivity server 460 may provide a Domain Name System (DNS) function of connecting a session of the first and second electronic devices 410 and 420. In various embodiments, the connectivity server 460 may connect the first and second electronic devices 410 and 420 according to the P2P scheme.

In various embodiments, the message server 470 may transmit, to the first and second electronic devices 410 and 420, a start request message for initiating image transmission/reception.

In various embodiments, the servers (e.g., the connectivity server 460 and the message server 470) may manage user accounts, profile information, and service subscription information.

In various embodiments, an electronic device, which requests (e.g., originates) a voice call connection or attempts to transmit an image during execution of a voice call regardless of a main agent receiving a voice call connection request, may become an origination terminal, and an electronic device receiving the image may become a reception terminal. In various embodiments, different user interfaces for an image service during execution of a voice call may be provided to an origination terminal and a reception terminal, and this configuration will be described in detail with reference to the following drawings.

Figure 5A:
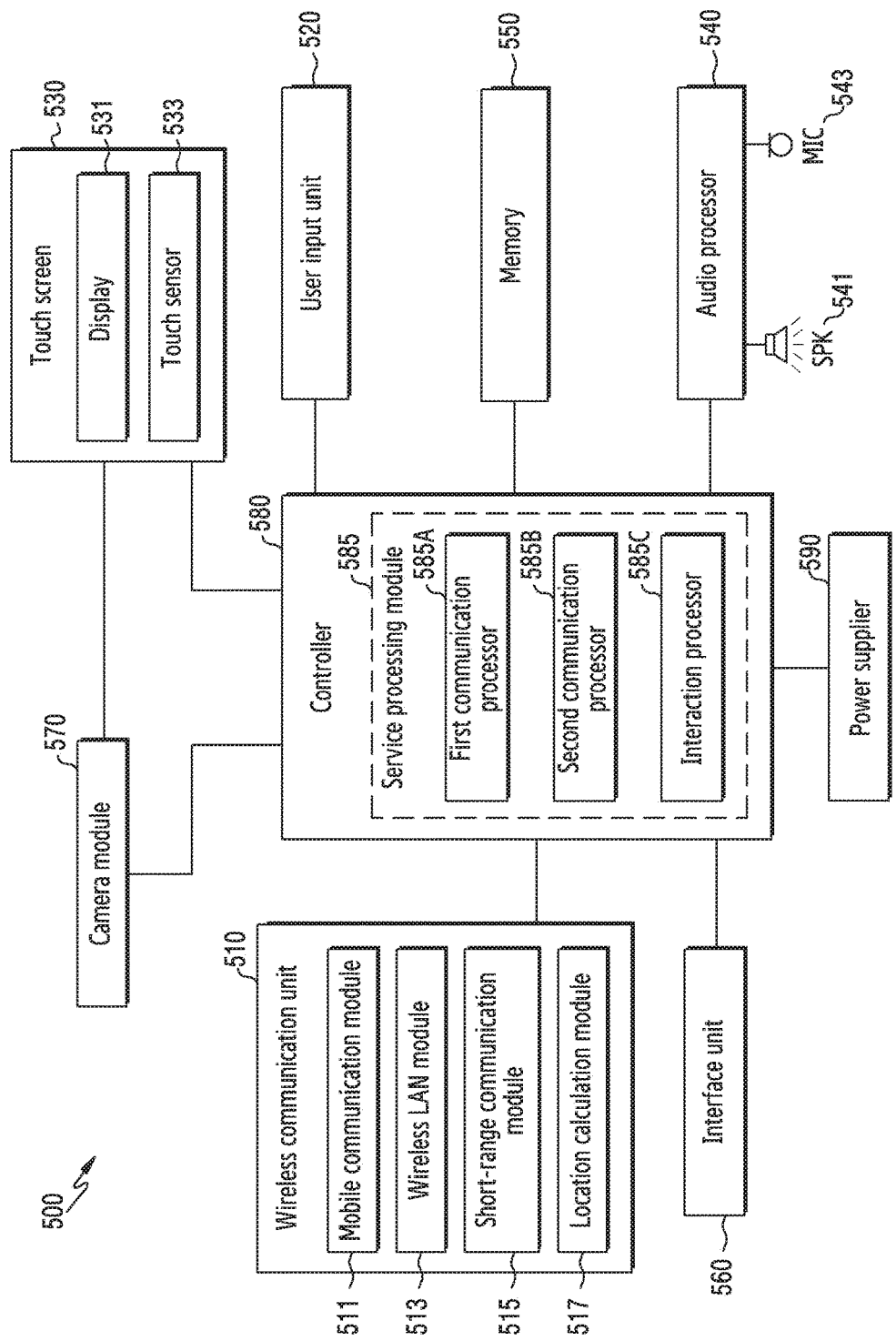
FIGS. 5A and 5B are views each schematically illustrating a configuration of an electronic device according to various embodiments of the present disclosure.

FIG. 5A is a view schematically illustrating a configuration of an electronic device according to various embodiments of the present disclosure.

Referring to FIG. 5A, the electronic device 500 according to various embodiments of the present disclosure may include, for example, a wireless communication unit 510, a user input unit 520, a touch screen 530, an audio processor 540, a memory 550, an interface unit 560, a camera module 570, a controller 580 (e.g., the processor 120), and a power supplier 590. In various embodiments of the present disclosure, the electronic device 500 does not need to essentially include the elements illustrated in FIG. 5A, and thus may be implemented such that the same includes elements the number of which is greater or less than that of the elements illustrated in FIG. 5A.

The wireless communication unit 510 may include elements identical or similar to those of, for example, the communication module 220 illustrated in FIG. 2. The wireless communication unit 510 may include one or more modules that enable wireless communication between the electronic device 500 and an external electronic device (e.g., another electronic device 102 or 104, or the server 106). For example, the wireless communication unit 510 may include a mobile communication module 511, a Wireless Local Area Network (WLAN) module 513, a short-range communication module 515, a location calculation module 517, and the like. In various embodiments, the wireless communication unit 510 may include modules (e.g., a short-range communication module and a long-range communication module) configured to perform communication with a neighboring external electronic device.

The mobile communication module 511 may include elements identical or similar to those of, for example, the cellular module 221 illustrated in FIG. 2. The mobile communication module 511 may transmit/receive, over a mobile communication network, a wireless signal to/from at least one of a base station, an external electronic device (e.g., another electronic device 104), and various servers (e.g., an application server, a management server, an integration server, a provider server, a content server, an Internet server, and a cloud server). Examples of a wireless signal may include a voice signal, a data signal, or various types of control signals. The mobile communication module 511 may transmit various data required for an operation of the electronic device 500, to an external device (e.g., the server 106 or another electronic device 104) in response to a user's request.

The WLAN module 513 may include elements identical or similar to those of, for example, the Wi-Fi module 223 illustrated in FIG. 2. The WLAN module 513 may refer to a module configured to gain wireless Internet access and form a WLAN link with another external electronic device (e.g., another electronic device 102 or the server 106). The WLAN module 513 may be mounted on the inside or outside of the electronic device 500. As wireless Internet technology, use may be made of include Wi-Fi, Wireless broadband (Wibro), World interoperability for Microwave access (Wi-Max), High Speed Downlink Packet Access (HSDPA), millimeter Wave (mmWave), or the like. The WLAN module 513 may transmit various types of data of the electronic device 500 to the outside or may receive data from the outside while operating in conjunction with another external electronic device (e.g., another electronic device 104) connected to the electronic device 500 through a network (e.g., a wireless Internet network) (e.g., the network 162). The WLAN module 513 may always maintain an on-state, or may be turned on according to the settings of the electronic device 500 or according to a user input entered to the electronic device 500.

The short-range communication module 515 may refer to a module configured to perform short-range communication. As short-range communication technology, use may be made of Bluetooth, Bluetooth Low Energy (BLE), Radio Frequency Identification (RFID), Infrared Data Association (IrDA), Ultra Wideband (UWB), ZigBee, Near Field Communication (NFC), or the like. The short-range communication module 515 may transmit various types of data of the electronic device 500 to an external electronic device or may receive data from the external electronic device while operating in conjunction with the another external electronic device (e.g., another electronic device 102) connected to the electronic device 500 through a network (e.g., a short-range communication network). The short-range communication module 515 may always maintain an on-state, or may be turned on according to the settings of the electronic device 500 or according to a user input entered to the electronic device 500.

The location calculation module 517 may include elements identical or similar to those of, for example, the GNSS module 227 illustrated in FIG. 2. The location calculation module 517 is a module configured to acquire the location of the electronic device 500, and may include a Global Positioning System (GPS) module as a representative example. The location calculation module 517 may measure the location of the electronic device 500 on the principles of triangulation.

The user input unit 520 may generate, in response to a user input, input data for controlling an operation of the electronic device 500. The user input unit 520 may include at least one input device configured to detect various types of user inputs. For example, the user input unit 520 may include a keypad, a dome switch, a physical button, a touch pad (resistive/capacitive), a jog & shuttle, a sensor (e.g., the sensor module 240), and the like.

A part of the user input unit 520 may be implemented in a button type on the outside of the electronic device 500, or a part or the whole thereof may be implemented by a touch panel. The user input unit 520 may receive a user input for initiating an operation (e.g., an audio reproduction function, a connection function for the electronic device, or an image transmission or sharing function) of the electronic device 500 according to various embodiments of the present disclosure, and may generate an input signal according to the user input.

The touch screen 530 may refer to an input/output device capable of simultaneously performing an input function and a display function, and may include a display 531 (e.g., the display 160 or 260) and a touch sensor 533. The touch screen 530: may provide an input/output interface between the electronic device 500 and a user; and may include the role of an intermediary for delivering the user's touch input to the electronic device 500 and also displaying, to the user, an output from the electronic device 500. The touch screen 530 may display a visual output to the user. A visual output may be displayed in the form of text, graphics, video, or a combination thereof.

The display 531 may display (output) various pieces of information processed by the electronic device 500. For example, the display 531 may display a User Interface (UI) or a Graphic User Interface (GUI) related to an image service during execution of a voice call. As the display 531, various types of displays (e.g., the display 160) may be used. In various embodiments, as the display 531, a bendable display may be used.

In various embodiments, the display 531 may be given flexibility, which enables the display 531 to be folded or unfolded, by substituting a plastic film for a glass substrate that encloses liquid crystal in a Liquid Crystal Display (LCD), a Light-Emitting Diode (LED), an Organic LED (OLED), an Active Matrix OLED (AMOLED), and the like. In various embodiments, the display 531 may extend to at least one side (e.g., at least one side among the left, right, top, and bottom sides) of the electronic device 500, and may be engaged with the at least one side of the housing of the electronic device 500 while being folded at the radius of curvature (e.g., 5 cm, 1 cm, 7.5 mm, 5 mm, or 4 mm), which enables the bendable display to operate, or lower.

The touch sensor 533 may securely mounted to the display 531, and may detect a user input when an input means comes in contact with or approaches the surface of the touch screen 530. A user input may include a touch event or a proximity event which is input based on at least one of a single-touch, a multi-touch, hovering, and an air gesture. In various embodiments, the touch sensor 533 may receive a user input for initiating an operation related to the use of the electronic device 500, and may generate an input signal according to the user input. According to various embodiments, the touch sensor 533 may be configured to convert, into an electrical input signal, a variation of pressure applied to a particular part of the display 531, or a variation of capacitance or the like which occurs at the particular part thereof. The touch sensor 533 may detect a position and an area on the surface of the display 531 that an input means (e.g., a user's finger or an electronic pen) touches or approaches. Also, the touch sensor 533 may be implemented to detect even a pressure generated during a touch (e.g., a force touch) according to the applied touch scheme.

The audio processor 540 may include elements identical or similar to those of, for example, the audio module 280 illustrated in FIG. 2. The audio processor 540 may perform a function of transmitting, to a speaker (SPK) 541, an audio signal received as input from the controller 580, and may perform a function of delivering, to the controller 580, an audio signal (e.g., a voice) received as input from a microphone (MIC) 543. Under the control of the controller 580, the audio processor 540 may convert voice/sound data into an audible sound to output the audible sound through the speaker 541, and may convert an audio signal, such as a voice, received from the microphone 543 into a digital signal to deliver the digital signal to the controller 180.

The speaker 541 may output audio data which is received from the wireless communication unit 510 or is stored in the memory 550. The speaker 541 may output sound signals related to various operations (functions) performed by the electronic device 500.

The microphone 543 may receive, as input, an external sound signal and may process the external sound signal into electrical voice data. Various noise reduction algorithms may be implemented in the microphone 543 to remove noise generated in the process of receiving an external sound signal. The microphone 543 may serve to input an audio stream such as a voice command (e.g., a voice command for initiating a function, such as a function of connecting an electronic device, an audio reproduction function, or an image transmission or sharing function).

The memory 550 (e.g., the memory 130 or 230) may store one or more programs executed by the controller 580, and may also perform a function of temporarily storing the input/output data. The input/output data may include a file, such as a moving image, an image, a photograph, or audio, and network information (or communication quality information). The memory 550 may serve to store the acquired data, the data which is acquired in real time may be stored in a transient storage apparatus, and data having been determined to be stored may be stored in a non-transient storage apparatus.

In various embodiments, the memory 550 may store one or more programs, data, or instructions which are related to: performing a voice call between the electronic device and another electronic device via first communication; determining, in response to a service execution request during the voice call, whether a service connection is made, based at least in part on whether the electronic device can perform data communication with the another electronic device via second communication and based at least in part on data communication quality; and when the service connection is determined to be made, displaying an image acquired through a camera (e.g., the camera module 570) on the display 531, and transmitting the acquired image to the another electronic device via the second communication.

The memory 550 may include one or more application modules (or software modules) and the like.

The interface unit 560 may include elements identical or similar to those of, for example, the interface 270 illustrated in FIG. 2. The interface unit 560 may receive data or power from another electronic device, and may deliver the received data or power to each element within the electronic device 500. The interface unit 560 enables the electronic device 500 to transmit data within the electronic device 500 to another electronic device. For example, the interface unit 560 may include a wired/wireless headset port, an external charger port, a wired/wireless data port, a memory card port, an audio input/output port, a video input/output port, an earphone port, and the like.

The camera module 570 (e.g., the camera module 291) may refer to an element that supports a capturing function of the electronic device 500. Under the control of the controller 580, the camera module 570 may capture an image of any subject, and may deliver the captured data (e.g., a moving image or an image) to the display 531 and the controller 580. In various embodiments of the present disclosure, although not illustrated, the camera module 570 may include an internal camera module mounted within the electronic device 500, or an external camera module connected to the electronic device 500 through a wired or wireless interface (e.g., a cable connection or a Bluetooth connection). Examples of the camera module 570 may include: neighboring camera device (e.g., a Virtual Reality (VR) device and a 360 camera (a 360-degree camera)) connected to the electronic device 500 via Bluetooth; and other electronic devices (e.g., a robot cleaner, a Television (TV), and a monitor) including respective cameras. According to various embodiments, the camera module 570 may include an attachable/detachable camera module.

The controller 580 may control an overall operation of the electronic device 500. In various embodiments, the controller 580 may include elements identical or similar to those of, for example, the processor 210 illustrated in FIG. 2. In various embodiments, the controller 580 may process: performing a voice call between the electronic device and another electronic device via first communication; determining, in response to a service execution request during the voice call, whether a service connection is made, based at least in part on whether the electronic device can perform data communication with the another electronic device via second communication and based at least in part on data communication quality; and when the service connection is determined to be made, displaying an image acquired through a camera on the display 531, and transmitting the acquired image to the another electronic device via the second communication.

The controller 580 may include one or more processors configured to control an operation of the electronic device 500. In various embodiments, the controller 580 may control operations of hardware modules, including the audio processor 540, the interface unit 560, the display 531, the camera module 570, and the like. A control operation of the controller 580 according to various embodiments of the present disclosure will be described in detail with reference to the following drawings.

According to various embodiments of the present disclosure, the controller 580 may be implemented by one or more processors that execute one or more programs stored in the memory 550 and control an operation of the electronic device 500 according to various embodiments of the present disclosure.

According to various embodiments of the present disclosure, the controller 580 may include a service processing module 585 configured to process a service connection related to an image service during a voice call. According to various embodiments, the service processing module 585 may include, for example, a first communication processor 585A, a second communication processor 585B, an interaction processor 585C, and the like.

According to various embodiments, the first communication processor 585A may process an operation related to the execution of a voice call between electronic devices on the basis of, for example, a first communication (which is Circuit Switch (CS) communication, e.g., 3G communication) (e.g., the first network 430).

According to various embodiments, the second communication processor 585B may process an operation related to the execution of an image service between electronic devices on the basis of, for example, second communication (which is a Packet Switch (PS) communication, e.g., data communication) (e.g., the second network 450). According to various embodiments, the second communication processor 585B: may determine, in response to a service execution request during execution of a voice call via first communication, whether a service connection is made, based at least in part on whether the electronic device can perform data communication with another electronic device via second communication and based at least in part on data communication quality; and when the service connection is determined to be made, may display an acquired image on the display 531, and may transmit the acquired image to the another electronic device via the second communication.

According to various embodiments, the interaction processor 585C may process an operation related to the provision of a user interface related to an image service during a voice call. According to various embodiments, the interaction processor 585C may process a user's interaction which is input based on a user interface related to an image service during a voice call.

Under the control of the controller 580, the power supplier 590 may receive external power and internal power which are applied thereto, and may supply power required for an operation of each element of the electronic device 500. In various embodiments of the present disclosure, under the control of the controller 580, the power supplier 590 may supply power to the display 531, the camera module 570, and the like, or may cut off power supplied thereto.

Figure 5B:
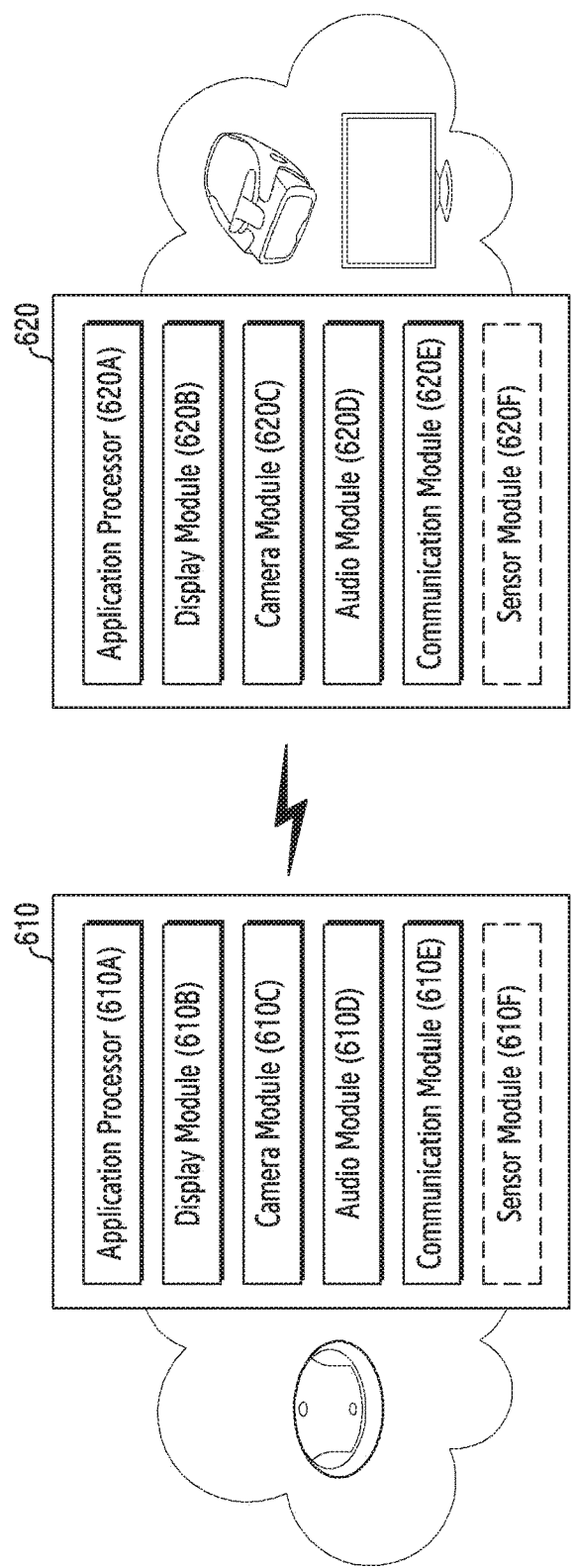

FIG. 5B is a view schematically illustrating configurations of electronic devices according to various embodiments of the present disclosure.

Referring to FIG. 5B, the electronic device 500 according to various embodiments of the present disclosure may include, for example, a first electronic device 610 (e.g., a transmission electronic device) for an origination-side operation of providing (transmitting) an image, and a second electronic device 620 (e.g., a reception electronic device) for a reception-side operation of being provided with (receiving) an image.

According to various embodiments, each of the first and second electronic devices 610 and 620 may include elements respectively corresponding to those illustrated in FIG. 5A. For example, the first or second electronic device 610 or 620 may include an application processor 610A or 620A, a display module 610B or 620B, a camera module 610C or 620C, an audio module 610D or 620D, a communication module 610E or 620E, and the like. The first or second electronic device 610 or 620 may further include a sensor module 610F or 620F according to the type of electronic device.

According to various embodiments, the first or second electronic device 610 or 620 may be connected to another electronic device (or a neighboring device) (e.g., a VR device, a display device (e.g., a TV or a monitor), a camera capable of capturing an image at 360 degrees (e.g., a 360 camera), or a robot cleaner) according to a wired communication scheme or at least one wireless communication scheme through the communication module 610E or 620E.

According to various embodiments, the first electronic device 610 (e.g., a transmission electronic device) may determine (check or identify) whether an image service is available for the second electronic device 620 (e.g., a reception electronic device). In various embodiments, a determination of the availability of an image service may include an operation of determining whether a service application is installed, an operation of identifying the state of a network, and an operation of identifying various conditions, such as a memory, a battery, a camera, and a fee policy of each of the first and second electronic devices 610 and 620.

According to various embodiments, the first electronic device 610 (e.g., a transmission electronic device) may additionally identify the capability of the second electronic device 620 (e.g., a reception electronic device). In various embodiments, the capability of an electronic device may include the type thereof or device information of at least one electronic device that is connected (or can be connected)

thereto. In various embodiments, the types of electronic devices may be classified into a smart phone, a tablet PC, a notebook, and the like, and each electronic device may include another element according to the type thereof. According to an embodiment, when the type of electronic device is a notebook, a notebook may not include a sensor module. Accordingly, in various embodiments, the identification of the type of electronic device may include the identification of information on elements included in each electronic device. In various embodiments, at least one electronic device (e.g., a neighboring device) that is connected (or can be connected) to an electronic device may include a VR device, a display device (e.g., a TV or a monitor), a camera capable of capturing an image at 360 degrees (e.g., a 360 camera), and a robot cleaner.

According to various embodiments, examples of the type of electronic device, a neighboring device that is connected (or can be connected) to each electronic device, and a function performed according to a connection relationship thereof are shown in Table 1 below.

TABLE 1

| | First electronic device | First neighboring device | Second electronic device | Second neighboring device | Function |
| --- | --- | --- | --- | --- | --- |
| Example 1 | smart phone | X | smart phone | X | first object |
| Example 2 | smart phone | X | notebook | X | first object |
| Example 3 | smart phone | X | smart phone | VR device | second object |
| Example 4 | smart phone | 360 camera | smart phone | X | third object |
| Example 5 | smart phone | 360 camera | smart phone | VR device | second & third objects |
| Example 6 | smart phone | 360 camera | notebook | X | first object |

Referring to Table 1, the first electronic device may refer to a transmission electronic device configured to perform an origination-side operation of transmitting an image, the first neighboring device may refer to a device that is connected (can be connected) to the first electronic device, the second electronic device may refer to a reception electronic device configured to perform a reception-side operation of receiving an image, the second neighboring device may refer to a device that is connected (can be connected) to the second electronic device, and the function may refer to the type of object (e.g., an icon or text), displayed by the first electronic device, and/or an execution function according to the relationships of the first electronic device, the first neighboring device, the second electronic device, and the second neighboring device.

According to an embodiment, example 1 may indicate a case where the first and second electronic devices are smart phones and there are no neighboring devices that are connected (or can be connected) to the first and second electronic devices. In an environment of example 1, the first electronic device may display the first object (e.g., a typical object (e.g., an icon) related to an image service).

According to an embodiment, example 2 may indicate a case where the first electronic device is a smart phone, the second electronic device is a notebook, and there are no neighboring devices that are connected (or can be connected) to the first and second electronic devices. In an environment of example 2, the first electronic device may display the first object. For example, when the second electronic device is a notebook, the notebook may not include a sensor module configured to detect the movement of an electronic device, and thus may display a typical icon.

According to an embodiment, example 3 may indicate a case where the first electronic device is a smart phone, the second electronic device is a smart phone, and the second neighboring device, which is connected (or can be connected) to the second electronic device, is a VR device. In an environment of example 3, the first electronic device may display the second object (e.g., a VR device-related object (e.g., an icon or text (e.g., VR))). According to various embodiments, when a user of the second electronic device identifies an image, which is transmitted by the first electronic device, through the second neighboring device (e.g., a VR device), VR information based on location information of the first electronic device may be additionally provided (e.g., transmitted) together with the image captured and transmitted by a user of the first electronic device.

According to an embodiment, example 4 may indicate a case where the first and second electronic devices are smart phones, the first neighboring device, which is connected (or can be connected) to the first electronic device, is a 360 camera, and there is no second neighboring device that is connected (or can be connected) to the second electronic device. In an environment of example 4, the first electronic device may display the third object (e.g., a 360 camera-related object (e.g., an icon or text (e.g., 360))). According to various embodiments, the second electronic device may determine whether the second electronic device is moved, on the basis of sensor information acquired through the sensor module included therein, and may provide the first electronic device with movement information according to the movement. The first electronic device may control the movement of the first neighboring device (e.g., a 360 camera) on the basis of the movement information of the second electronic device, and thus may transmit the captured image to the second electronic device. For example, the user of the second electronic device may identify an image in his/her intended direction (e.g., an image captured by a 360 camera) on the basis of the movement of the second electronic device.

According to an embodiment, example 5 may indicate a case where the first and second electronic devices are smart phones, the first neighboring device, which is connected (or can be connected) to the first electronic device, is a 360 camera, and the second neighboring device, which is connected (or can be connected) to the second electronic device, is a VR device. In an environment of example 5, the first electronic device may display, together, the second object corresponding to example 3 and the third object corresponding to example 4.

According to an embodiment, example 6 may indicate a case where the first electronic device is a smart phone, the second electronic device is a notebook, the first neighboring device, which is connected (or can be connected) to the first electronic device, is a 360 camera, and there is no second neighboring device that is connected (or can be connected) to the second electronic device. In an environment of example 6, the first electronic device may display the first object. For example, when the second electronic device is a notebook, the notebook may not include a sensor module configured to detect the movement of an electronic device, and thus may display a typical icon.

As described in the examples with reference to FIG. 5B and Table 1, according to various embodiments, the identification of the capability of each of the first and second electronic devices 610 and 620 makes it possible to identify a service which can be provided, and a service (e.g., a typical image service (e.g., an image service performed by a camera included in an electronic device), a 360 image service performed by a 360 camera, or a VR image service performed by a VR device) may be determined by a user's selection. Additionally or alternatively, according to various embodiments, an expire time (e.g., a maximum waiting time) included in a video communication connection may be changed based on the service determined by the user's selection. For example, in the case of a communication connection for a typical image service, an expire time (or a maximum waiting time) may be a first time (e.g., 15 seconds), and in the case of a communication connection for a VR image service or a 360 image service, an expire time (or a maximum waiting time) may be a second time (e.g., 30 seconds). According to an embodiment, a VR image service or a 360 image service makes it possible to transmit a larger amount of data than a typical image service, and thus makes it possible to change an expire time (e.g., a maximum waiting time) to the second time which is longer than the first time. For example, according to various embodiments, an expire time may be differently configured according to the state of an image service (or the state of an image), and to this end, a service request information may be configured in a server or an electronic device.

According to various embodiments, various image services may be provided by considering various conditions of electronic devices and the capability of each electronic device. According to an embodiment, the first electronic device 610 may be connected to various neighboring devices capable of acquiring images. The first electronic device 610 may identify whether an image is acquired through the internal camera module or through a neighboring device. Also, when an image is acquired through a neighboring device, the first electronic device 610 may identify the type of the neighboring device. The first electronic device 610 may identify the above-described various device conditions, may determine whether the second electronic device 620 satisfies a device condition corresponding to the identified device condition, and may provide various (different) types of icons for an image service on the basis of a result of the determination.

According to various embodiments, when electronic devices perform a voice call therebetween, a connection-available state may be pre-provided through activation or deactivation of an object (e.g., an icon or text, i.e., a service button for execution of an image service) for the image service according to various device conditions. For example, when the first electronic device 610 performs a voice call with the second electronic device 620, the first electronic device 610: may predetermine whether it is possible to establish an image service connection with the second electronic device 620; and in the state in which it is possible to establish the image service connection therewith, may activate an object for an image service and provide the same. Also, according to various embodiments, the first electronic device 610 may provide information on an image service connection by providing different types of activated objects according to device conditions.

As described above, the electronic device 500 according to various embodiments of the present disclosure includes: a display; at least one communication circuit configured to establish wireless communication with an external electronic device by using at least one protocol; a processor electrically connected to the display and the at least one communication circuit; and a memory electrically connected to the processor, wherein the memory may store instructions that, when executed, cause the processor to: display a user interface on the display, wherein the user interface includes an indication of whether it is possible to perform video communication with the external electronic device; establish a video call with the external electronic device while displaying the user interface; transmit, using the at least one communication circuit, a first signal for requesting whether it is possible to perform the video communication; receive, using the at least one communication circuit, a second signal indicating whether it is possible to perform the video communication; adapt, in response to the second signal, the indication indicating that it is possible to perform the video communication with the external electronic device; receive a user input for selecting the indication; and initiate, in response to the user input, transmission of video data to the external electronic device.

According to various embodiments, the indication may include at least one of an icon and text.

According to various embodiments, the instructions cause the processor to: monitor whether it is possible to perform the video communication; and adapt the indication when it is determined that it is impossible to perform the video communication with the external electronic device.

According to various embodiments, the instructions cause the processor to: when it is possible to perform the video communication with the external electronic device, display the indication such that the indication is activated; and when it is impossible to perform the video communication with the external electronic device, display the indication such that the indication is deactivated.

As described above, the electronic device 500 according to various embodiments of the present disclosure includes: a camera; a display; a communication circuit; and a processor functionally connected to the camera, the display, and the communication circuit, wherein the processor may be configured to: perform a voice call with another electronic device via first communication; determine, in response to a service execution request during the voice call, whether a service connection is established, based at least in part on data communication quality and whether it is possible to perform data communication with the another electronic device via second communication; and when the service connection is determined to be established, display, on the display, an image acquired through the camera and transmit the acquired image to the another electronic device via the second communication.

According to various embodiments, the processor may be configured to determine, during the voice call, whether the another electronic device is affiliated with a service. According to various embodiments, the processor may be configured to determine whether the another electronic device is affiliated with the service, on the basis of service subscription information of the electronic device.

According to various embodiments, the processor may be configured to, when whether the another electronic device is affiliated with the service is not identified based on the service subscription information of the electronic device, request a server to identify whether the another electronic device is affiliated with the service.

According to various embodiments, the processor may be configured to process, in response to a service execution request, an operation for a data communication connection with the another electronic device in order to execute the service. According to various embodiments, the processor may be configured to: transmit a connection request message in response to the service execution request; and wait for reception of a connection response message corresponding to the connection request message, for a determined maximum waiting time. According to various embodiments, the processor may be configured to, when the connection response message is not received for the maximum waiting time, terminate the voice call; and re-establish a voice and data communication connection via the second communication.

According to various embodiments, the processor may be configured to: transmit the connection request message when the another electronic device is affiliated with the service; and terminate the execution of the service connection when the another electronic device is not affiliated with the service.

According to various embodiments, the processor may be configured to wait for reception of a participation message, for a determined maximum waiting time in response to the reception of the connection response message. According to various embodiments, the processor may be configured to: when the participation message is not received for the maximum waiting time, determine that the service connection fails; and process termination of the service connection.

Figure 6A:
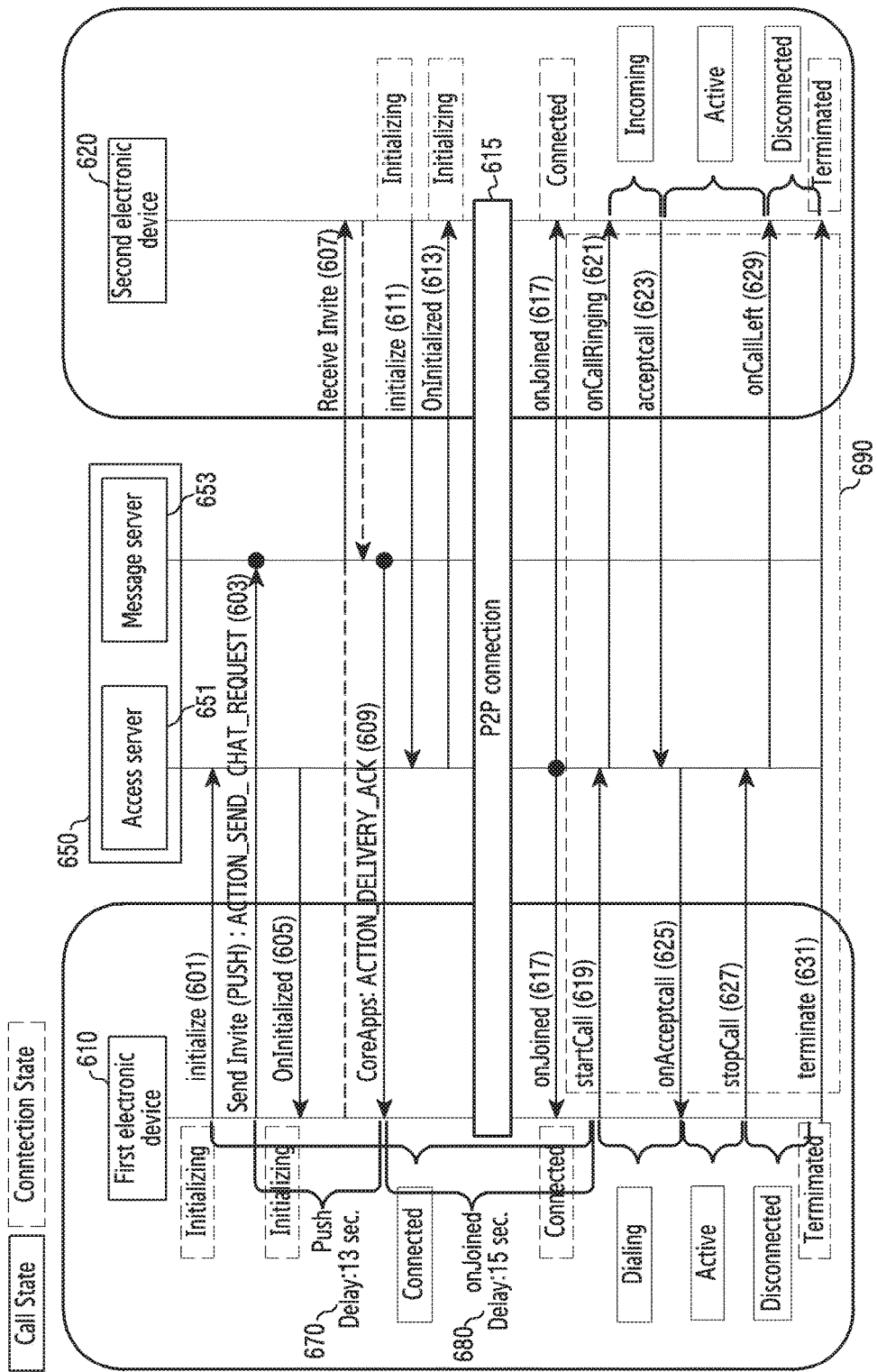
FIGS. 6A and 6B are views illustrated for explaining a data communication connection operation in a system according to various embodiments of the present disclosure.

FIG. 6A is a view illustrated for explaining a data communication connection operation in a system according to various embodiments of the present disclosure.

As noted in FIG. 6A, FIG. 6A illustrates a procedure for establishing a data communication connection (e.g., a P2P connection) through a server 650 of the second network 450 in order to provide an image service, while the first and second electronic devices 610 and 620 perform a voice call therebetween through the first network 430. FIG. 6A illustrates an example in which, while performing a voice call between the first electronic device 610 and the second electronic device 620 in the state of being connected to the second electronic device 620 through the first network 430, the first electronic device 610 attempts to establish a data communication connection therewith.

Referring to FIG. 6A, in operation 601, the first electronic device 610 may transmit, to an access server 651, an initial configuration message (e.g., an initialize message) for establishing a session for image transmission/reception. According to an embodiment, the first electronic device 610 may detect a user input for executing an image service during a voice call, and may transmit an initialize message to the access server 651 on the basis of the user input. In operation 605, in response to the initial configuration message for establishing a session of the first electronic device 610, the access server 651 may transmit, to the first electronic device 610, a configuration response message (e.g., an OnInitialized message) for session establishment.

In operation 603, the first electronic device 610 may transmit a connection request message (e.g., a Send Invite (PUSH): ACTION_SEND_CHAT_REQUEST message) (or an invitation message) for transmitting an image, to the second electronic device 620 through the message server 633. In operation 607, the second electronic device 620 may receive the connection request message (or the invitation message) through the message server 653.

In operation 609, in response to reception of the connection request message of the first electronic device 610 from the message server 653, the second electronic device 620 may transmit a connection response (acknowledge) message (e.g., a CoreApps: ACTION_DELIVERY_ACK message), which notifies of normal reception of the connection request message, to the first electronic device 610 through the message server 653.

In operation 611, in response to transmission of the connection response message, the second electronic device 620 may transmit, to the access server 651, an initial configuration message (e.g., an initialize message) for establishing a session for image transmission/reception. According to an embodiment, the first electronic device 610 may detect a user input for executing an image service during the voice call, and may transmit an initialize message to the access server 651 on the basis of the user input. In operation 613, in response to the initial configuration message for establishing a session of the second electronic device 620, the access server 651 may transmit, to the second electronic device 620, a configuration response message (e.g., an OnInitialized message) for session establishment.

In operation 615, the first and second electronic devices 610 and 620 may establish a session for image transmission/reception. For example, a data communication connection (e.g., a P2P connection) may be established between the first and second electronic devices 610 and 620.

According to various embodiments, the first electronic device 610 may transmit, to the message server 653, a connection request message for transmitting an image to the second electronic device 620 during a voice call, and then may determine a maximum waiting time (e.g., a Push Delay Expired time) 670 (e.g., 13 seconds) required to wait for reception of a connection response message of the second electronic device 620 corresponding to the connection request message. In various embodiments, the maximum waiting time 670 may be determined after the first electronic device 610 transmits a connection request message, or may be predetermined and be stored in the first electronic device 610.

In various embodiments, after the first electronic device 610 transmits a connection request message, the first electronic device 610 may count the maximum waiting time 670. According to various embodiments, when no connection response message is received from the second electronic device 620 for the maximum waiting time 670, the first electronic device 610 may determine the relevant case as a condition in which it is impossible to perform data communication during the voice call. When it is determined that it is impossible to perform data communication, the first electronic device 610 may terminate the voice call, and may return to the above-described operation 603 to process execution of operation 603 and operations following the same. According to an embodiment, when no connection response message is received from the second electronic device 620 for the maximum waiting time in the state in which the second electronic device 620 is affiliated with a service for image transmission, the first electronic device 610 may determine that it is impossible to perform data communication due to unstable network conditions and the like. Accordingly, the first electronic device 610 may terminate the voice call being performed through the first network, and may reconnect a voice call and a video call via data communication established through the second network. For example, the first electronic device 610 may terminate the execution of the voice call via 3G communication, and may perform a video call via VoIP communication.

In operation 617, when a data communication connection (e.g., a P2P connection) is established between the first and second electronic devices 610 and 620, the access server 651 may transmit, to the first and second electronic devices 610 and 620, a participation message (e.g., an onJoined message) which reports that the counterpart electronic devices participate in the session.

In various embodiments, after a connection response message of the second electronic device 620 is received from the message server 653, the first electronic device 610 may determine a maximum waiting time (e.g., an onJoined Delay Expired time) 680 (e.g., 15 seconds) required to wait for a participation message from the access server 651. In various embodiments, the maximum waiting time 680 may be determined after the first electronic device 610 receives a connection response message, or may be predetermined and be stored in the first electronic device 610.

In various embodiments, the first electronic device 610 receives the connection response message, and then may count the maximum waiting time 680. According to various embodiments, when no participation message is received from the access server 651 for the maximum waiting time 680, the first electronic device 610 may determine the relevant case as a condition in which data communication can be performed but data communication quality is poor (which is a state in which data communication cannot be performed, e.g., when the electronic device 500 is located in a shadow area). When data communication quality is poor, the first electronic device 610 may determine that a data communication connection fails. When a participation message is received for the maximum waiting time 680, the first electronic device 610 may determine that a data communication connection is normal, and may continuously perform the following operations.

In various embodiments, operation 690 (e.g., operations 619, 621, 623, 625, 627, 629, and 631) after operation 617 may include: an operation (e.g., operations 619 and 621) of notifying, by the first electronic device 610, the second electronic device 620 of a service connection request for image transmission; an operation (e.g., operations 623 and 625) of transmitting/receiving an image between the first and second electronic devices 610 and 620 according to a user input entered to the second electronic device 620; and an operation (e.g., operations 627, 629, and 631) of terminating a service connection.

According to various embodiments, it may be difficult for the first electronic device 610 to determine whether the first electronic device 610 can perform data communication with the second electronic device 620 while performing a voice call between the first and second electronic devices 610 and 620, before reception of a user input (e.g., selection of a service execution button) for transmitting an image while a user of the first electronic device 610 performs a voice call between him/her and a user of the second electronic device 620. Accordingly, it may be difficult for the first electronic device 610 to determine a scheme for making a data communication connection so as to maintain a stable service connection.

In various embodiments, a condition, in which it is possible to perform data communication, and data communication quality may be determined based at least in part on whether a connection response message or a participation message is received for a limited time (e.g., the maximum waiting time 670 or the maximum waiting time 680) during a data communication connection procedure.

According to various embodiments, when a connection response message is received from the second electronic device 620, the first electronic device 610 may determine an additional waiting time (e.g., the maximum waiting time 670). When a participation message is received from the access server 651 for the additional waiting time, the first electronic device 610 may determine that a service connection is successful. When no participation message is received, the first electronic device 610 may determine that the service connection fails, and may terminate the service connection.

According to various embodiments, when no connection response message is received from the second electronic device 620, the first electronic device 610 may determine the relevant case as a condition in which it is impossible to perform data communication with the second electronic device 620 during a voice call, may terminate the voice call, and may restart the transmission of an invitation message so as to establish a service connection.

Figure 6B:
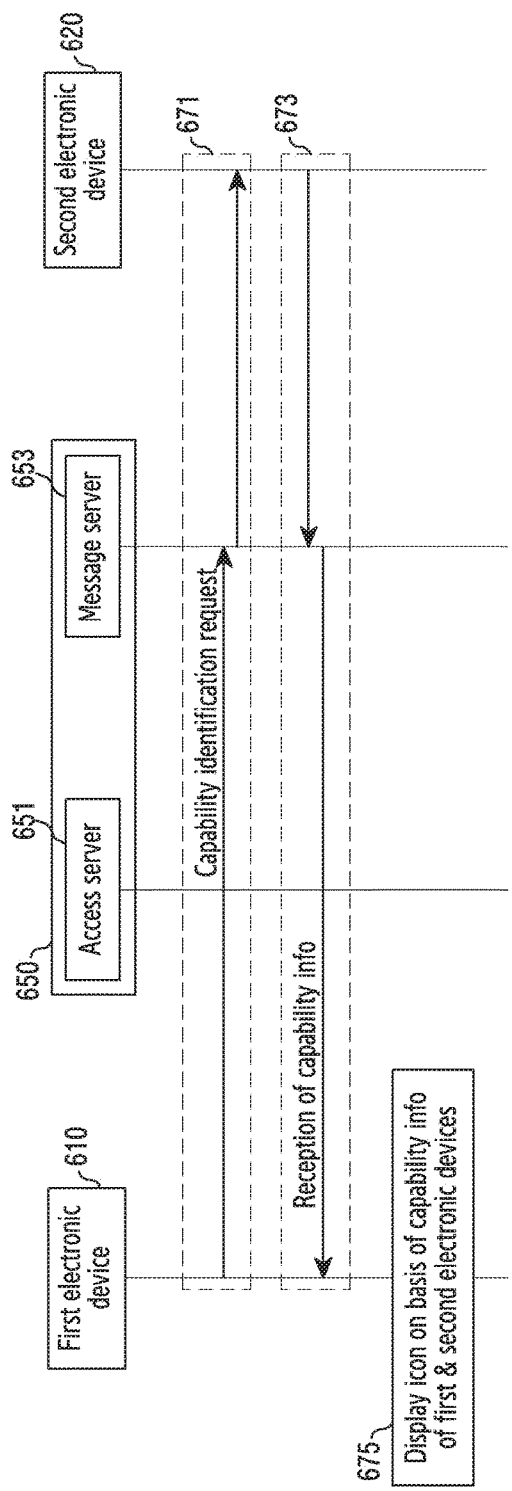

FIG. 6B is a view illustrated for explaining an operation of identifying the capability of an electronic device in a system according to various embodiments of the present disclosure.

Referring to FIG. 6B, in operation 671, the first electronic device 610 may transmit a capability request message for identifying a device condition of the second electronic device 620 (e.g., the capability of the second electronic device 620), to the second electronic device 620 through the server 650 (e.g., the message server 653).

In operation 673, in response to reception of the capability request message of the first electronic device 610 from the server 650 (e.g., the message server 653), the second electronic device 620 may transmit a capability response message including capability information of the second electronic device 620, to the first electronic device 610 through the server 650 (e.g., the message server 653).

In operation 675, in response to reception of the capability response message of the second electronic device 620 from the server 650 (e.g., the message server 653), the first electronic device 610 may display an object on the basis of the capability information of the second electronic device 620.

According to various embodiments, the first electronic device 610 may request capability information of the second electronic device 620, and may provide different types of objects (e.g., an icon and text) for an image service by using the capability information (e.g., hereinafter, second capability information) of the second electronic device 620 received in response to a capability information request, and by using capability information (hereinafter first capability information) of the first electronic device 610. According to various embodiments, services to be provided may be differently determined according to the types of the first and second electronic devices 610 and 620 and/or a combination of neighboring devices connected to each of the first and second electronic devices 610 and 620, and thus different objects may be provided according to the determined services. According to an embodiment, the first electronic device 610 may identify the first capability information, and may determine a display scheme for an object on the basis of the first capability information and the second capability information. For example, as described above with reference to Table 1, the first electronic device 610 may operate so as to display at least one object among the first, second, third objects on the basis of the first capability information and the second capability information.

According to various embodiments, the operation of identifying the capability of an electronic device as illustrated in FIG. 6B may be performed between the next operation of the connection establishment operation of FIG. 6A (e.g., operation 609 and operations following operation 609) and the previous operation of the operation of receiving a participation message (e.g., an onJoined message), for example, between operation 609 and operation 617. According to an embodiment, the operation of identifying the capability of an electronic device may be performed in the operation of establishing an initial connection with the second electronic device 620, or may be performed in the operation of establishing an image service connection during a voice call (e.g., the operation of participating in a session by the first and second electronic devices 610 and 620).

Figure 7A:
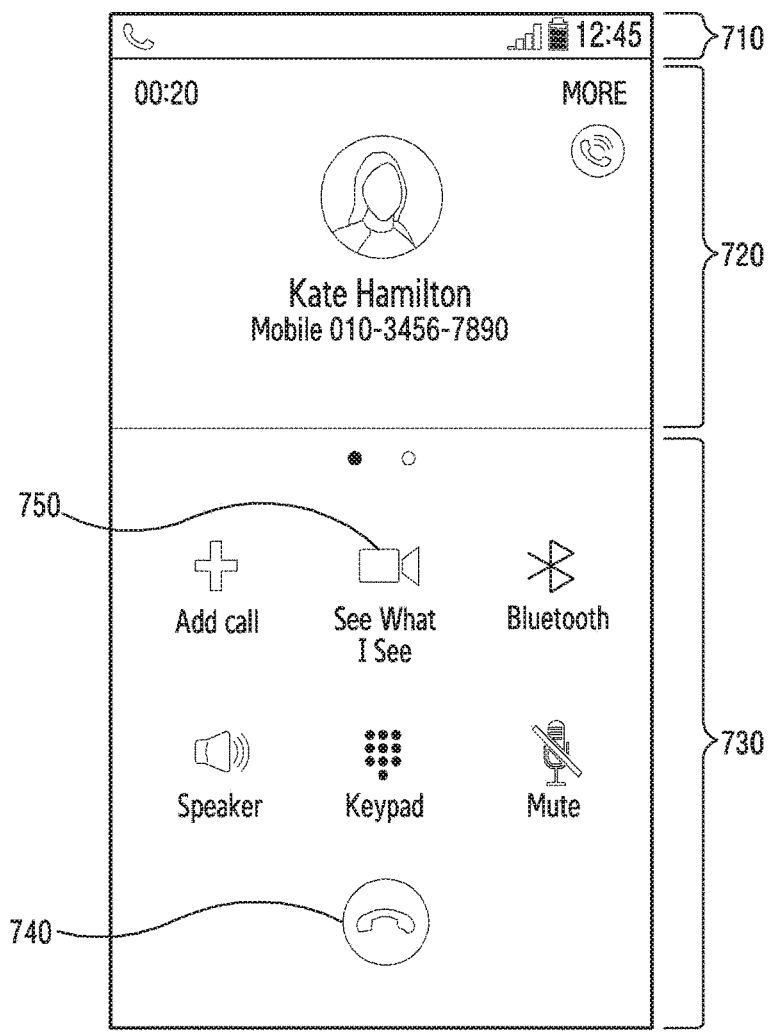
FIGS. 7A, 7B, and 7C are views illustrated for explaining examples of screens in the case of execution of a service by an electronic device according to various embodiments of the present disclosure.
Figure 7B:
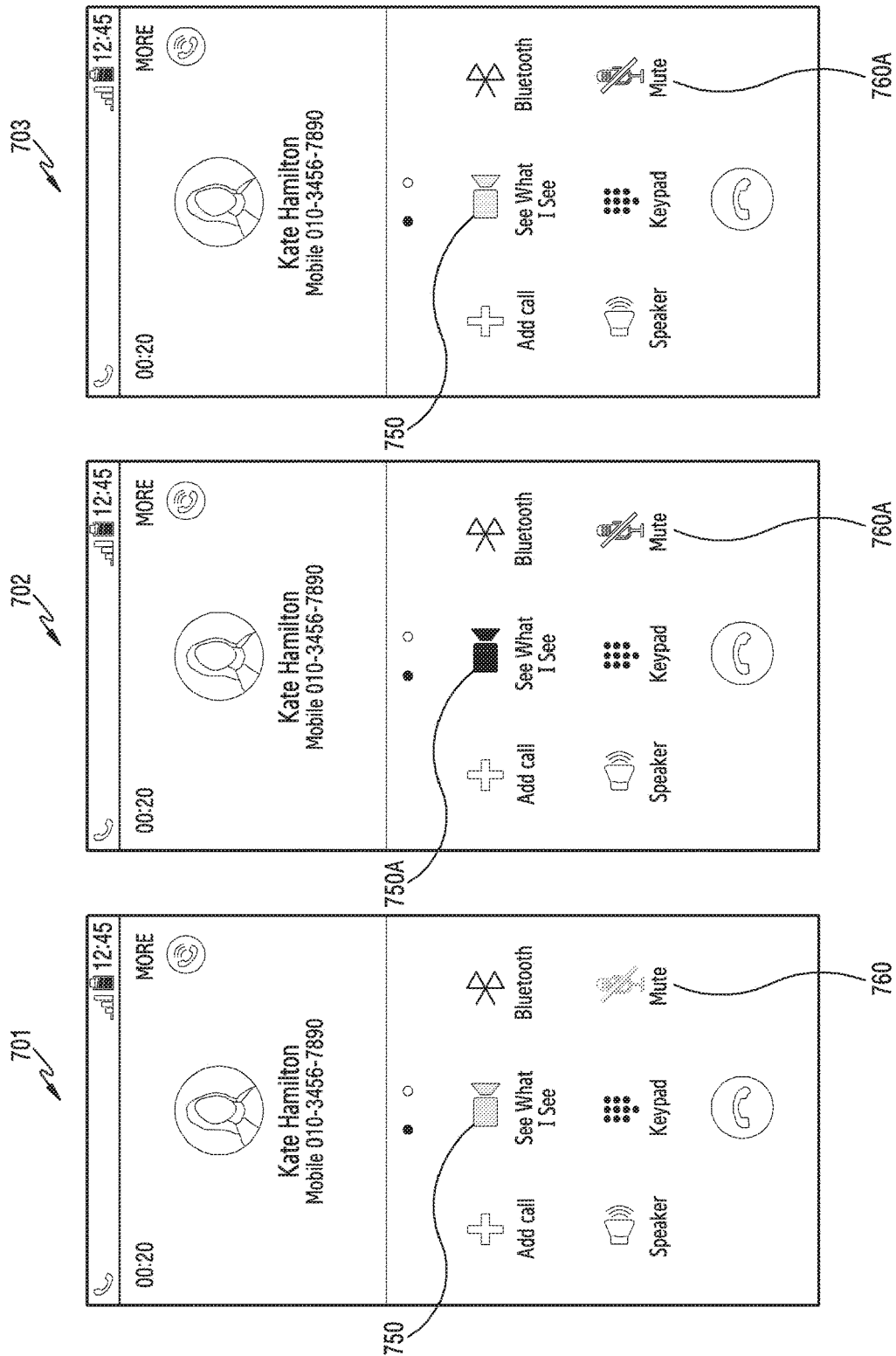
Figure 7C:
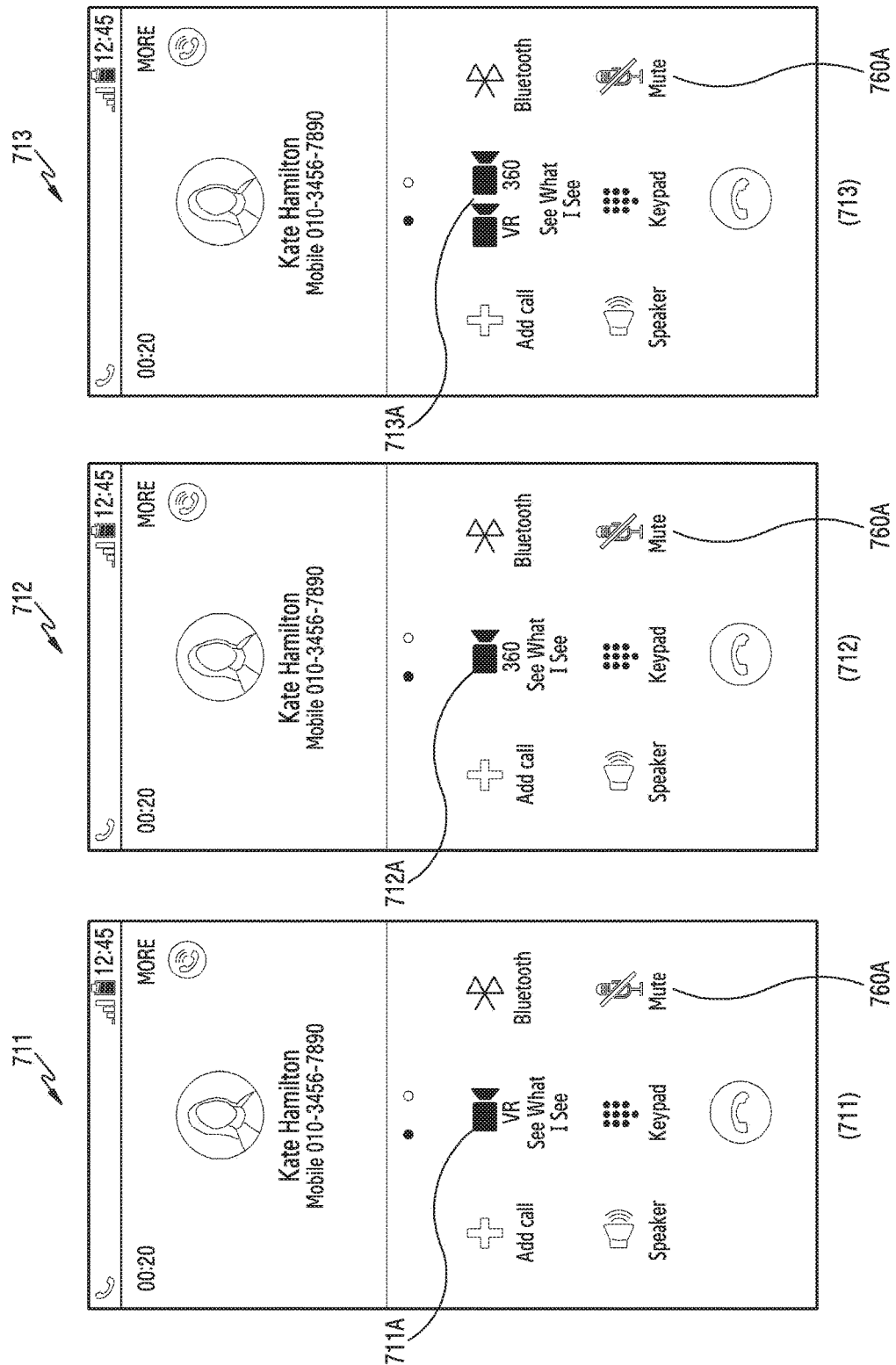

FIGS. 7A, 7B, and 7C are views illustrated for explaining examples of screens in the case of execution of a service by an electronic device according to various embodiments of the present disclosure.

Referring to FIG. 7A, FIG. 7A illustrates an example of a screen of a service user interface that the electronic device 500 provides while performing a voice call. In various embodiments, FIG. 7A may illustrate an example of a screen of an origination terminal that transmits an image, and a reception terminal, which receives an image, may also provide a screen of a user interface corresponding to that of FIG. 7A in a voice call-related operation.

As illustrated in FIG. 7A, a service user interface may include an indicator area 710, a call information area 720, and a function selection area 730.

In various embodiments, the indicator area 710 may provide information related to the use of the electronic device 500 (e.g., information on state of charge, time, call state, and alarm), information received from the outside (e.g., weather information, received-message information, and feed information), and/or the like.

In various embodiments, the call information area 720 may provide a call state, a call time, call counterpart information, and the like while the electronic device 500 performs a voice call.

In various embodiments, the function selection area 730 may provide objects (e.g., icons and text) for various functions (or applications) that the electronic device 500 can perform (execute) while performing a voice call. According to an embodiment, the function selection area 730 may include an object (e.g., an Add call button) capable of adding a voice call counterpart, an object for image transmission (e.g., See What I See (SWIS) button) (hereinafter "service button") 750, an object for Bluetooth configuration (e.g., a Bluetooth button), an object for configuring a volume or speaker mode (e.g., a Speaker button), an object for invoking a keypad (e.g., a Keypad button), an object for a mute condition (e.g., a Mute button), an object for call termination (e.g., an End button) 740, and the like.

According to various embodiments of the present disclosure, the electronic device 500 may receive (detect) a user input on the basis of the service button 750 while performing a voice call with another electronic device (e.g., the second electronic device 620). Upon receiving a user input through the service button 750, the electronic device 500 may determine the reception of the user input as execution of an image service for transmitting an image (e.g., an image captured in real time by the camera, or a stored image) to the another electronic device (e.g., the second electronic device 620) with which a voice call is currently being performed. According to various embodiments, when the electronic device 500 determines the execution of an image service, the electronic device 500 may operate the camera (e.g., the camera module 570) according to a configuration scheme, and may initiate a service connection operation (e.g., display of a related user interface and transmission of a service connection request) for transmitting an image (e.g., a preview image) acquired through the camera. According to various embodiments, when the electronic device 500 determines the execution of an image service, the electronic device 500 may extract internally-stored images according to the configured scheme, and may initiate a service connection operation (e.g., display of a related user interface and transmission of a service connection request) for transmitting the extracted image (e.g., an image selected by a user after a list of the extracted images is displayed).

According to various embodiments, various types of service user interfaces may be provided according to a connection state of the electronic device 500, and examples thereof are illustrated in FIG. 7B.

Referring to FIG. 7B, FIG. 7B may illustrate an example in which the electronic device 500 displays activation or deactivation of an object (e.g., the service button 750) for an image service on the basis of a result (e.g., the availability of a service) of service state identification, which the electronic device 500 together with a counterpart electronic device performs, when the electronic device 500 performs a voice call with the counterpart electronic device. By this configuration, a user may intuitively identify information on a state in which it is possible to establish a service connection.

According to an embodiment, a screen 701 may refer to an example of a screen while the electronic device 500 attempts to perform a voice call (e.g., during call origination). For example, as illustrated in a screen 701, an object (e.g., the service button 750) for an image service may be provided in its deactivated state (e.g., a gray or dim-processed icon). In addition, the electronic device 500 may provide, in its deactivated state, an object (e.g., the Mute button 760) corresponding to a function which is unusable while the electronic device 500 attempts to perform a voice call.

According to an embodiment, a screen 702 may refer to an example of a screen in a case where it is identified that the electronic device 500 can perform an image service with a counterpart electronic device while the electronic device 500 attempts to perform a voice call with the counterpart electronic device, or while the electronic device 500 performs a voice call with the counterpart electronic device (e.g., in a state in which a connection for communication for a voice call is established). For example, as illustrated in the screen 702, the state of an object (e.g., the service button 750) for an image service is changed from a deactivated state to an activated state, and the activated object 750A may be provided. In addition, the electronic device 500 may change the state of an object (e.g., the Mute button 760), which is a deactivated state when a connection for communication for a voice call is established and the electronic device 500 performs the voice call, from the deactivated state to an activated state, and may provide the activated object 760A.

According to an embodiment, a screen 703 may refer to an example of a screen in a case where it is identified that it is impossible to perform an image service with a counterpart electronic device while the electronic device 500 attempts to perform a voice call with the counterpart electronic device, or while a connection for communication for a voice call is established and the electronic device 500 performs the voice call with the counterpart electronic device. For example, as illustrated in the screen 703, an object (e.g., the service button 750) for an image service may be displayed in its deactivated state. In addition, the electronic device 500 may change the state of an object (e.g., the Mute button 760), which is a deactivated state when a connection for communication for a voice call is established and the electronic device 500 performs the voice call, from the deactivated state to an activated state, and may provide the activated object 760A.

According to various embodiments, as described above with reference to Table 1 and FIG. 6B, various types of objects (e.g., the service button 750) for an image service may be provided according to the capability of the electronic device 500. Examples of this configuration are illustrated in FIG. 7C.

An example in which an object for an image service is provided in examples (e.g., example 1 to example 6) according to device conditions will be described with reference to FIG. 7C and Table 1.

In environments of example 1, example 2, and example 6, an object (e.g., the service button 750) for an image service may be provided as a typical object (e.g., the first object) as in the example of the object 750A illustrated in the screen 702 of FIG. 7B.

In an environment of example 3, an object (e.g., the service button 750) for an image service may be provided as a related object (e.g., an icon and 'VR' text) on the basis of device information of a VR device as in the object 711A illustrated in the screen 711 of FIG. 7C.

In an environment of example 4, an object (e.g., the service button 750) for an image service may be provided as a related object (e.g., an icon and '360' text) on the basis of device information of a 360 camera as in the object 712A illustrated in the screen 712 of FIG. 7C.

In an environment of example 5, an object (e.g., the service button 750) for an image service may be provided as a related object (e.g., an icon and 'VR' text) based on device information of a VR device and as a related object (e.g., an icon and '360' text) based on device information of a 360 camera, as in the object 713A illustrated in the screen 713 of FIG. 7C.

Figure 8:
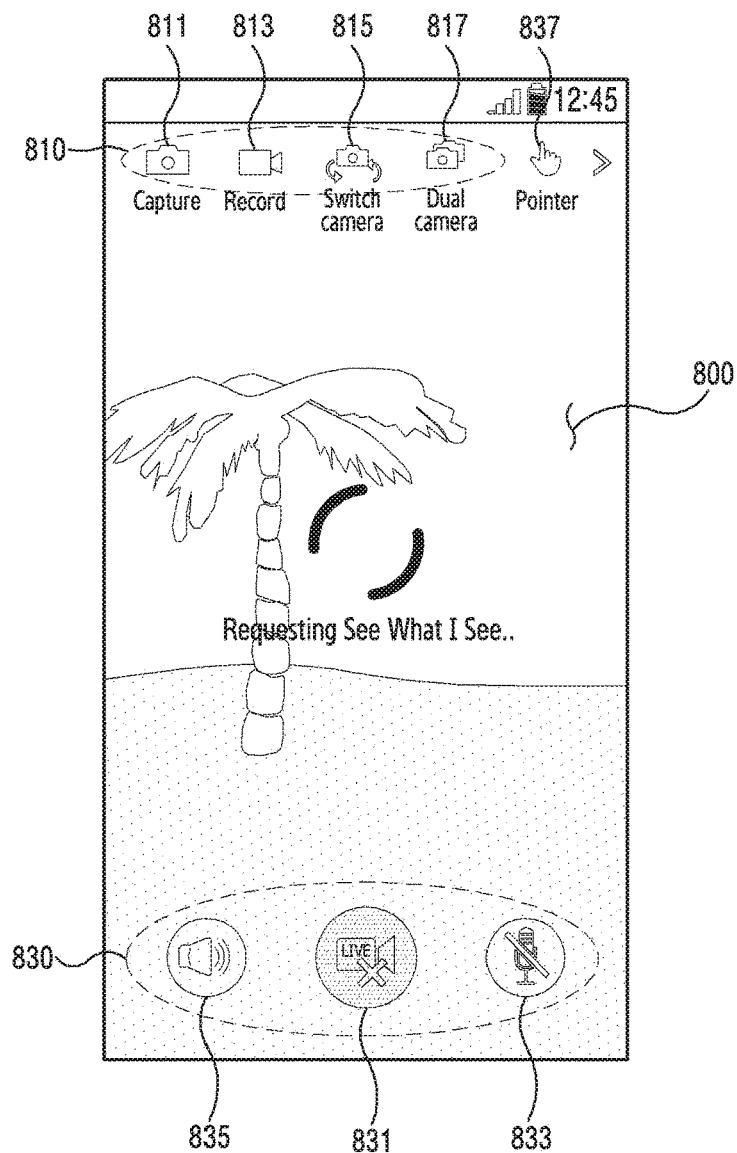
FIG. 8 is a view illustrated for explaining an example of a screen in the case of execution of a service by an electronic device according to various embodiments of the present disclosure.

In various embodiments, an example of a screen of a service user interface, which the electronic device 500 provides according to execution of a service while performing a voice call, is illustrated in FIG. 8.

FIG. 8 is a view illustrated for explaining an example of a screen in the case of execution of a service by an electronic device according to various embodiments of the present disclosure.

Referring to FIG. 8, FIG. 8 illustrates an example of a screen of a service user interface provided in the case of waiting for (or establishing) a service connection according to a service execution request during a voice call. In various embodiments, FIG. 8 may illustrate an example of a screen of an origination terminal, that is, the electronic device 500, which transmits an image.

As illustrated in FIG. 8, the service user interface includes a preview area 800, a first function selection area 810, and a second function selection area 830.

In various embodiments, the preview area 800 may refer to an area in which an image is displayed in response to execution of an image service during a voice call. According to an embodiment, the preview area 800 may provide a real-time image (or a live image) acquired through the camera (e.g., the camera module 570) (e.g., at least one of a front camera and a rear camera) operated in response to execution of a service. According to an embodiment, the preview area 800 may provide a list of images acquired from the inside or outside of the electronic device 500 in response to execution of a service, and may provide an image that a user has selected from the list.

In various embodiments, the first function area 810 may provide objects (e.g., icons and text) for various functions (or applications) related to an image service executed during a voice call. According to one embodiment, the first function area 810 may include: an object 811 (e.g., a Capture button) capable of capturing and storing an image displayed on the preview area 800; an object 813 (e.g., a Record button) capable of recording an image displayed on the preview area 800; an object 815 (e.g., a Switch camera button) capable of switching a camera (e.g., switching from a rear camera to a front camera, or switching from a front camera to a rear camera) that acquires an image; and an object 817 (e.g., a Dual camera button) for executing at least two cameras (e.g., a dual camera configured to simultaneously operate the front camera and the rear camera). According to various embodiments, the first function area 810 may be provided by the origination terminal in an image service, and may be implemented by various function buttons for performing storage, selection, configuration change, or the like of the image displayed on the preview area 800.

In various embodiments, the second function area 830 may provide objects (e.g., icons and text) for various functions (or applications) related to an image service and/or a voice call. According to an embodiment, the second function area 830 may refer to areas commonly provided by both an origination terminal and a reception terminal for an image service. According to an embodiment, the second function area 830 may include: an object 831 (e.g., an End SWIS button) for terminating an image service (e.g., termination of a service connection); an object 833 (e.g., a Speaker button) for configuring a volume or speaker mode; an object 835 (e.g., a Mute button) for a mute condition; an object 837 (e.g., a Pointer button) for invoking and displaying a pointer on the preview area 800; and the like.

In various embodiments, arrangement between the objects of the first function area 810 and those of the second function area 830 is not limited to the example illustrated in FIG. 8, and thus may be variously changed and designed according to the settings of the electronic device 500.

In various embodiments, the electronic device 500 (e.g., an origination terminal for image transmission) may provide one area of the preview area 800 with at least one of objects (e.g., an item (e.g., an animation icon) and text (e.g., Requesting See What I see . . . ) notifying of a progress state) notifying of the image service being executed in response to the execution of the image service. According to an embodiment, as described above, while performing a service connection procedure in order to establish a service connection with a reception terminal (e.g., before making an actual service connection with the reception terminal), the electronic device 500 may notify a user that the service connection is in progress, on the basis of an intuitive object.

Figure 9:
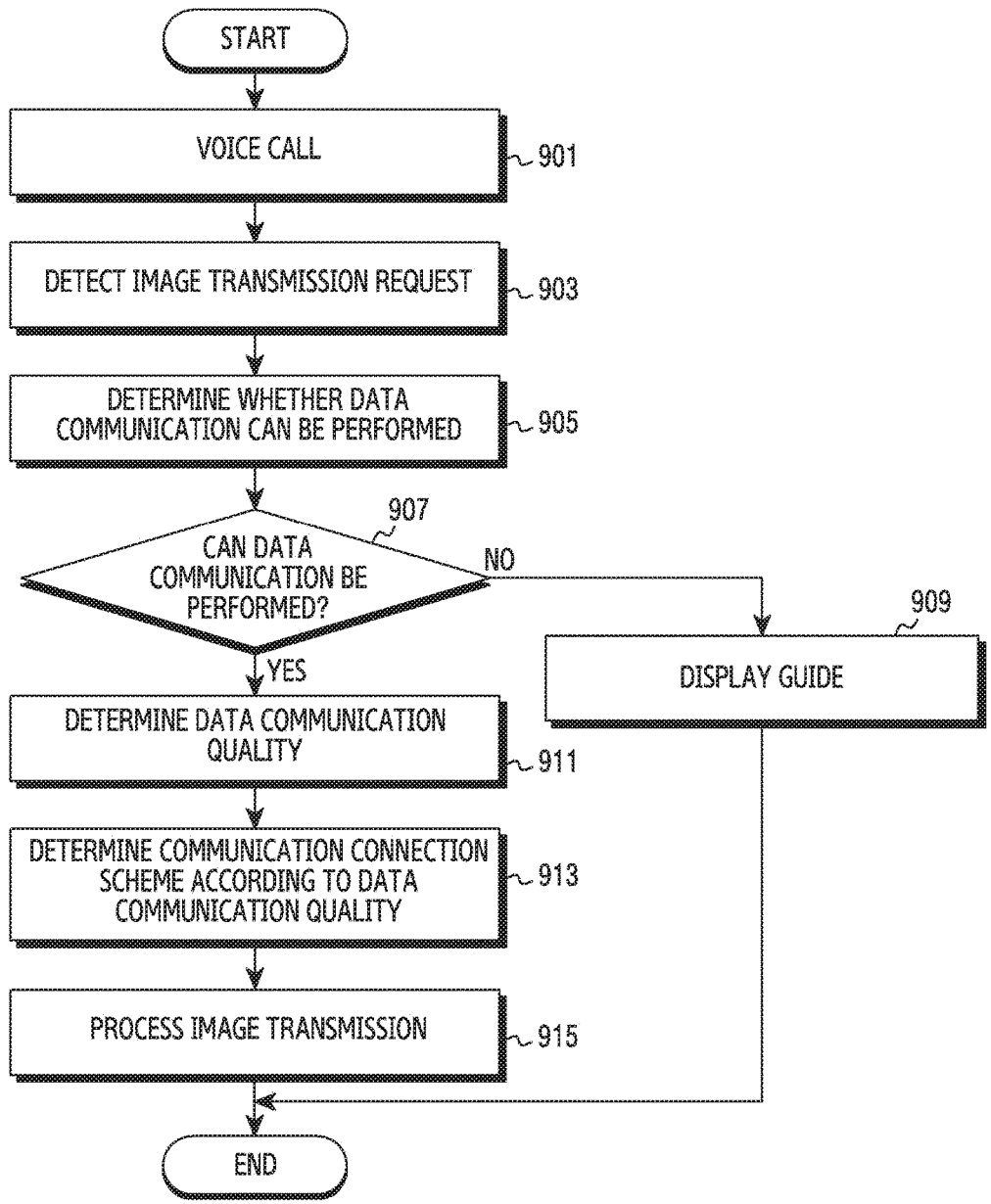
FIG. 9 is a flowchart illustrating a method for performing an image service by an electronic device according to various embodiments of the present disclosure.

FIG. 9 is a flowchart illustrating a method for performing an image service by an electronic device according to various embodiments of the present disclosure.

In various embodiments, FIG. 9 may illustrate an operation of an origination terminal for sending a request for a service connection for image transmission, to another electronic device with which a voice call is being performed, and transmitting an image when the service connection is made. For example, FIG. 9 may illustrate an example in which the electronic device 500 operates as an origination terminal.

Referring to FIG. 9, in operation 901, the controller 580 of the electronic device 500 (e.g., a processor of the electronic device operating as an origination terminal) may detect an image transmission request in operation 903 while performing a voice call. According to an embodiment, the controller 580 may process a typical operation related to execution of a voice call between the electronic device 500 and another electronic device (e.g., the second electronic device 620) via first communication. The controller 580 may determine whether a user makes a request (e.g., a user input) for an image service for image transmission during the voice call. For example, when the controller 580 detects selection of an object (e.g., the service button 750) provided for image transmission as in the above-described example of FIG. 7A during the voice call, the controller 580 may determine the detected selection of the object as execution of an image service.

In operation 905, the controller 580 may identify whether it is possible to perform data communication, and may determine, in operation 907, whether it is possible to perform data communication with the another electronic device with which a voice call is being performed. According to an embodiment, the controller 580 may determine whether the another electronic device, with which a voice call is currently being performed, is a terminal that is affiliated with an image service which enables image reception, on the basis of service subscription information. According to another embodiment, the controller 580 may identify the capability of the another electronic device with which a voice call is being performed. The capability of the another electronic device may include the type thereof and device information of at least one electronic device that is connected (or can be connected) thereto. In various embodiments, in order to increase the stability of a data communication connection, before actually attempting to establish a data communication connection, the controller 580 may determine whether it is possible to perform data communication with the another electronic device, based at least in part on service subscription information or the capability of the another electronic device.

In various embodiments, the service subscription information for determining whether the another electronic device is affiliated with an image service may be determined based on, for example, a contact database. According to various embodiments, a contact database may include a contact database stored in the electronic device 500, or a contact database stored in a server. According to various embodiments, when the service subscription information of the another electronic device is identified based on the contact database, the controller 580 may determine that the another electronic device is a device capable of performing data communication (e.g., a device to which a service connection can be made). According to various embodiments, when the service subscription information of the another electronic device is not identified based on the contact database, the controller 580 may determine that the another electronic device is a device not capable of performing data communication (e.g., a device to which a service connection cannot be made).

When it is determined, in operation 907, that it is impossible to perform data communication with the another electronic device with which a voice call is being performed (No in operation 907), in operation 909, the controller 580 may control guide display. According to an embodiment, when it is determined that a user of the another electronic device is not affiliated with a service or that the another electronic device cannot support a service according to a result of the identifying of the capability of the another electronic device, that is, when it is determined that it is impossible to perform data communication with the another electronic device, the controller 580 may output a guide message notifying a user of the electronic device 500 that image transmission cannot be performed in relation to an image transmission request made by the user of the electronic device 500. For example, the controller 580 may display, in a pop-up form, a configured guide message (e.g., a user of the another electronic device is not affiliated with a service, or the another electronic device cannot support a service according to a result of the identifying of the capability of the another electronic device). According to various embodiments, when it is determined that it is impossible to perform data communication with the another electronic device, the controller 580 may display, in its deactivated state, an object for an image service (e.g., the service button 750). Additionally or alternatively, the controller 580 may output a guide message as a voice message.

When it is determined, in operation 907, that it is possible to perform data communication with the another electronic device with which a voice call is being performed (Yes in operation 907), in operation 911, the controller 580 may determine data communication quality. According to various embodiments, when it is determined that the user of the another electronic device is affiliated with the service, or that the another electronic device can support the service according to the result of the identifying of the capability of the another electronic device, that is, when it is determined that it is possible to perform data communication with the another electronic device, the controller 580 may display, in its activated state, an object for an image service (e.g., the service button 750). In various embodiments, in order to increase the stability of a data communication connection, before actually attempting to establish a data communication connection, the controller 580 may determine data communication quality. In various embodiments, the controller 580 may send a request for a service connection to the another electronic device, and may determine data communication quality on the basis of whether a response corresponding to the request is received. In various embodiments, an example of determining data communication quality will be described in detail with reference to the following drawings.

In operation 913, the controller 580 may determine a communication connection scheme according to the determined data communication quality. According to various embodiments, when a response is received from the another electronic device, the controller 580 may determine that it is possible to establish a service connection, and may determine a data communication connection (e.g., a P2P connection) based on second communication. According to various embodiments, when no response is received from the another electronic device, the controller 580 may determine that it is impossible to establish a service connection (e.g., a condition in which data communication cannot be performed during the voice call), may terminate the voice call via the first communication, and may determine a voice and data communication connection (e.g., a VoIP connection) based on second communication.

In operation 915, the controller 580 may process image transmission. According to various embodiments, according to the determined communication connection scheme, the controller 580 may transmit an image (e.g., a real-time image or a stored image), acquired during the voice call, to the another electronic device with which the voice call is being performed. According to various embodiments, the controller 580 automatically executes a voice and data communication reconnection with the another electronic device according to the determined communication connection scheme, and then, the controller 580 may transmit an acquired image to the another electronic device when a reconnection is established between the electronic device 500 and the another electronic device.

Figure 10:
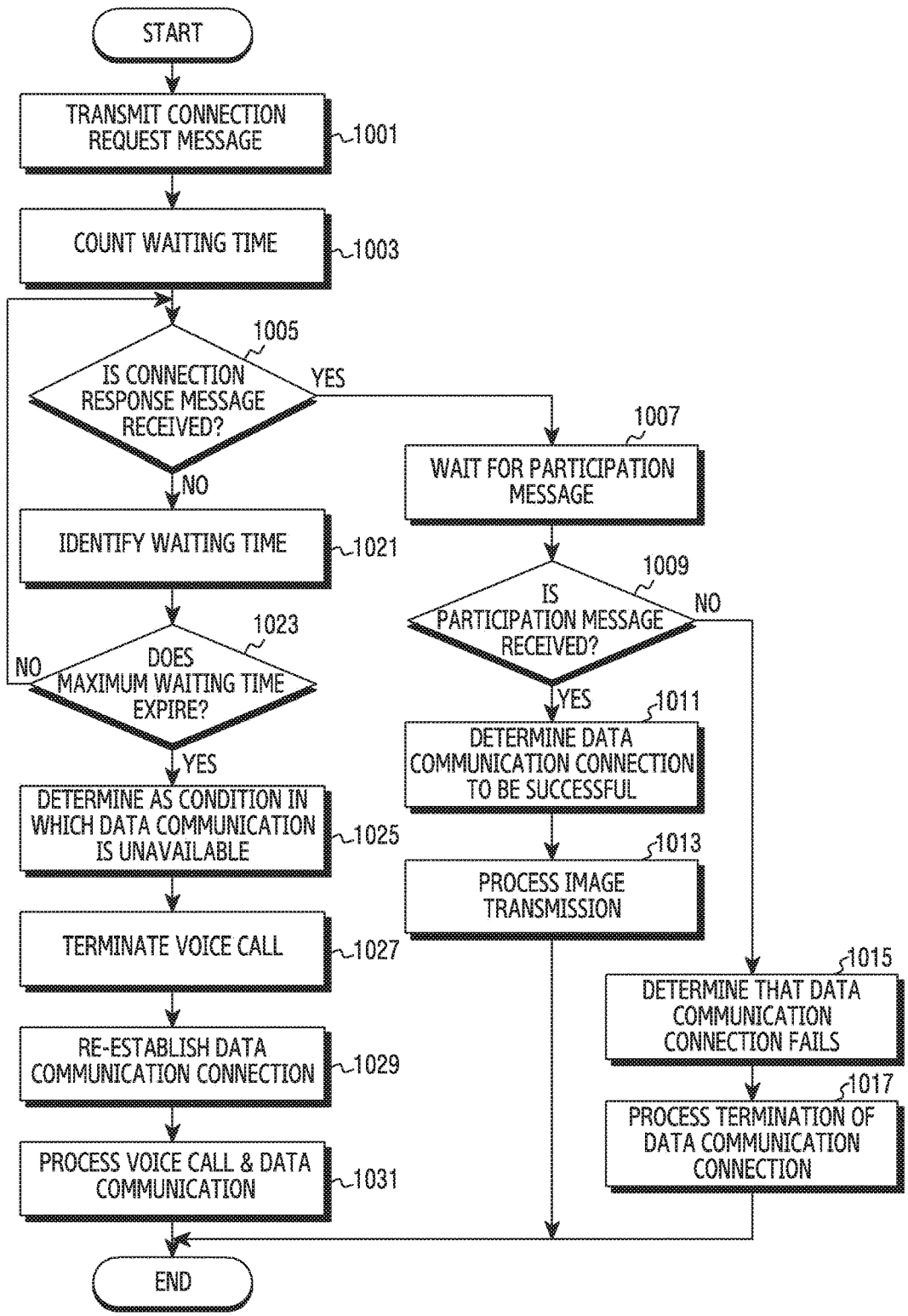
FIG. 10 is a flowchart illustrating a method for performing an image service by an electronic device according to various embodiments of the present disclosure.

FIG. 10 is a flowchart illustrating a method for performing an image service by an electronic device according to various embodiments of the present disclosure.

In various embodiments, FIG. 10 may illustrate an operation of an origination terminal for sending a request for a service connection for image transmission, to another electronic device with which a voice call is being performed and transmitting an image when the service connection is established. For example, FIG. 10 may illustrate an example in which the electronic device 500 operates as an origination terminal.

Referring to FIG. 10, in operation 1001, the controller 580 of the electronic device 500 (e.g., a processor of the electronic device operates as an origination terminal) may transmit a connection request message to the another electronic device. According to various embodiments, while the electronic device 500 performs a voice call with the another electronic device, the controller 580 may detect a user input for executing a connection for a service for image transmission. In response to the detected user input, the controller 580 may transmit a connection request message for a service connection to the another electronic device with which a voice call is being performed.

In operation 1003, the controller 580 may count a waiting time. According to various embodiments, when the controller 580 transmits, to the another electronic device, a connection request message for transmitting an image to the another electronic device during the execution of a voice call between the electronic device 500 and the another electronic device, the controller 580 may determine a waiting time (e.g., the maximum waiting time 670) required to wait for reception of a connection response message of the another electronic device corresponding to the connection request message. In various embodiments, a waiting time may be automatically determined by the electronic device 500 after transmitting a connection request message, or may be predetermined and stored in the electronic device 500. In various embodiments, after transmitting the connection request message, the controller 580 may count the determined or stored waiting time.

In operation 1005, the controller 580 may determine whether a connection response message is received from the another electronic device.

When no connection response message is received from the another electronic device (No in operation 1005), in operation 1021, the controller 580 may identify a waiting time, and may determine, in operation 1023, whether the maximum waiting time expires.

When it is determined, in operation 1023, that the maximum waiting time does not expire (No in operation 1023), the controller 580 may return to operation 1005, and may process executions of operation 1005 and operations following the same.

When it is determined, in operation 1023, that the maximum waiting time expires (Yes in operation 1023), in operation 1025, the controller 580 may determine the relevant case as a condition in which it is impossible to perform data communication. According to various embodiments, when a connection response message corresponding to no connection request message is received from the another electronic device, with which a voice call is being performed, for the maximum waiting time, the controller 580 may determine the relevant case as a condition in which it is impossible to perform data communication during the voice call.

In operation 1027, the controller 580 may terminate the voice call between the electronic device 500 and the another electronic device. According to various embodiments, when no connection response message is received and thus the controller 580 determines that data communication cannot be performed, the controller 580 may terminate the voice call which is being performed between the electronic device 500 and the another electronic device via the first communication. According to an embodiment, when, in the state in which the another electronic device is affiliated with a service for image transmission, no connection response message is received from the another electronic device for the maximum waiting time, the controller 580 may determine that data communication cannot be performed due to unstable network conditions and the like, and may terminate the voice call, which is being performed between the electronic device 500 and the another electronic device via the first communication, in order to re-establish a data communication connection. According to various embodiments, when the voice call is terminated, the controller 580 may process a guide output for the termination of the voice call. For example, in order to re-establish a data communication connection, the controller 580 may output a message notifying of the termination of the voice call on the basis of at least some of a pop-up window, a voice, and a vibration.

In operation 1029, the controller 580 may re-establish a data communication connection. According to various embodiments, the controller 580 may terminate the voice call being performed via the first communication, and may re-establish a connection for a voice and data communication (e.g., a video call) via second communication. For example, the controller 580 may terminate the voice call via 3G communication, and may perform a video call via VoIP communication.

In operation 1031, the controller 580 may process a voice call and data communication. According to various embodiments, the controller 580 may process image transmission on the basis of voice and data communication via second communication.

When the connection response message is received (Yes in operation 1005), in operation 1007, the controller 580 may wait for reception of a participation message, and may determine, in operation 1009, whether the participation message is received. According to various embodiments, in response to the connection response message, the controller 580 may determine that a data communication connection (e.g., a P2P connection) is established with the another electronic device, and may wait for reception of the participation message from a server (e.g., the access server 651). According to various embodiments, a participation message may refer to a message notifying electronic devices (e.g., the first and second electronic devices 610 and 620) that the counterpart electronic devices participate in a session when a data communication connection (e.g., a P2P connection) is established between the electronic devices through a server (e.g., the access server 651).

In various embodiments, after the controller 580 receives a connection response message from the another electronic device, the controller 580 may determine a waiting time (e.g., the maximum waiting time 680) required to wait for reception of a participation message from the access server 651. In various embodiments, the maximum waiting time may be determined by the electronic device 500 after the electronic device 500 receives a connection response message, or may be predetermined and stored in the electronic device 500. In various embodiments, after receiving a connection response message, the controller 580 may count the maximum waiting time, and may determine whether a participation message is received for the maximum waiting time.

When the participation message is received for the maximum waiting time (Yes in operation 1009), in operation 1011, the controller 580 may determine that a data communication connection is successful. For example, the controller 580 may determine establishment of a service connection which enables transmission of an image to the another electronic device while the electronic device performs the voice call with the another electronic device.

In operation 1013, the controller 580 may process transmission of an image to the another electronic device. According to various embodiments, during the voice call, the controller 580 may transmit, to the another electronic device, an image (e.g., a real-time image or a stored image) corresponding to a user's selection via second communication according to a data communication connection, rather than the first communication for a voice call.

When no participation message is received for the maximum waiting time (No in operation 1009), the controller 580 may determine, in operation 1015, that a data communication connection fails. For example, the controller 580 may determine that a service connection, which enables transmission of an image to the another electronic device during a voice call, fails. According to various embodiments, when no participation message is received, the controller 580 may determine the relevant case as a condition in which data communication can be performed but data communication quality is poor (e.g., which is a state in which data communication cannot be performed, e.g., when the electronic device 500 or the another electronic device is located in a shadow area). According to various embodiments, when it is determined that data communication quality is poor, the controller 580 may determine that a data communication connection (e.g., a service connection for image transmission) fails.

In operation 1017, the controller 580 may process termination of a data communication connection. According to various embodiments, while maintaining the voice call being performed via the first communication, the controller 580 may terminate a data communication connection (e.g., a service connection for image transmission) for performing second communication. According to various embodiments, when terminating a data communication connection, the controller 580 may process a guide output notifying of the termination of the data communication connection. For example, the controller 580 may output a message notifying the user that a data communication connection cannot be established, on the basis of at least some of a pop-up window, a voice, and a vibration.

Figure 11:
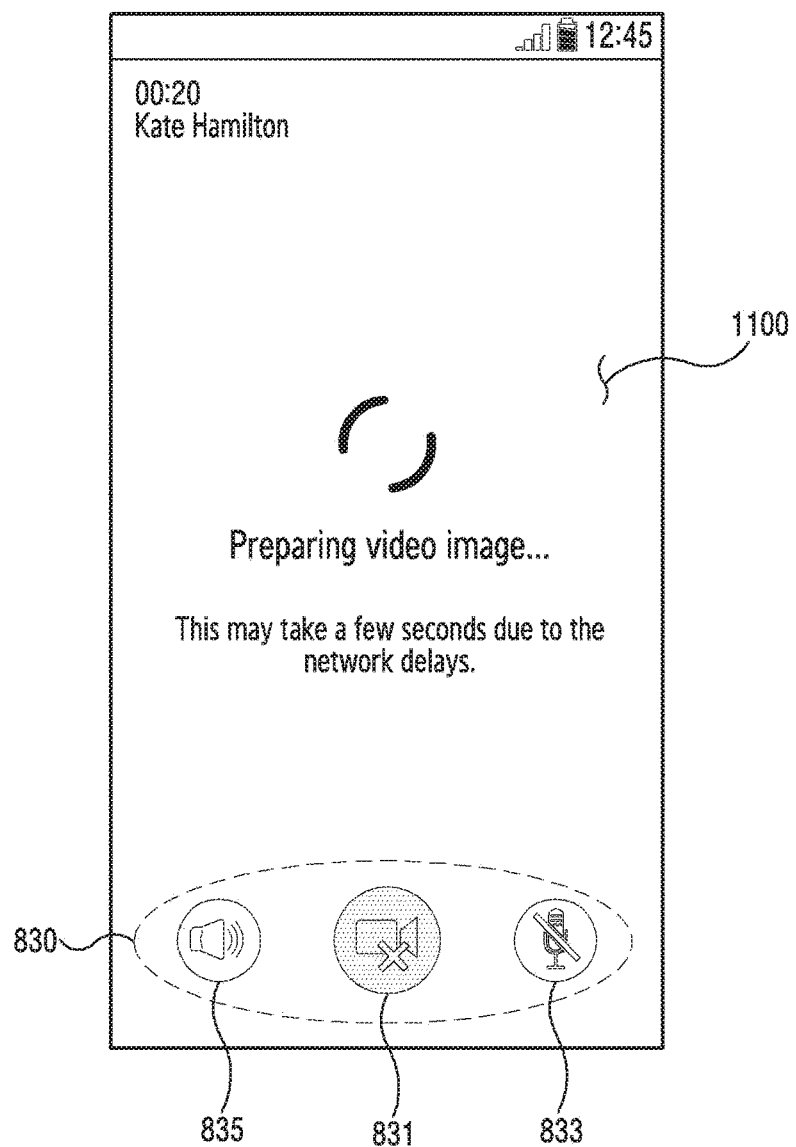
FIGS. 11 and 12 are views illustrated for explaining examples of screens in the case of execution of a service by an electronic device according to various embodiments of the present disclosure.
Figure 12:
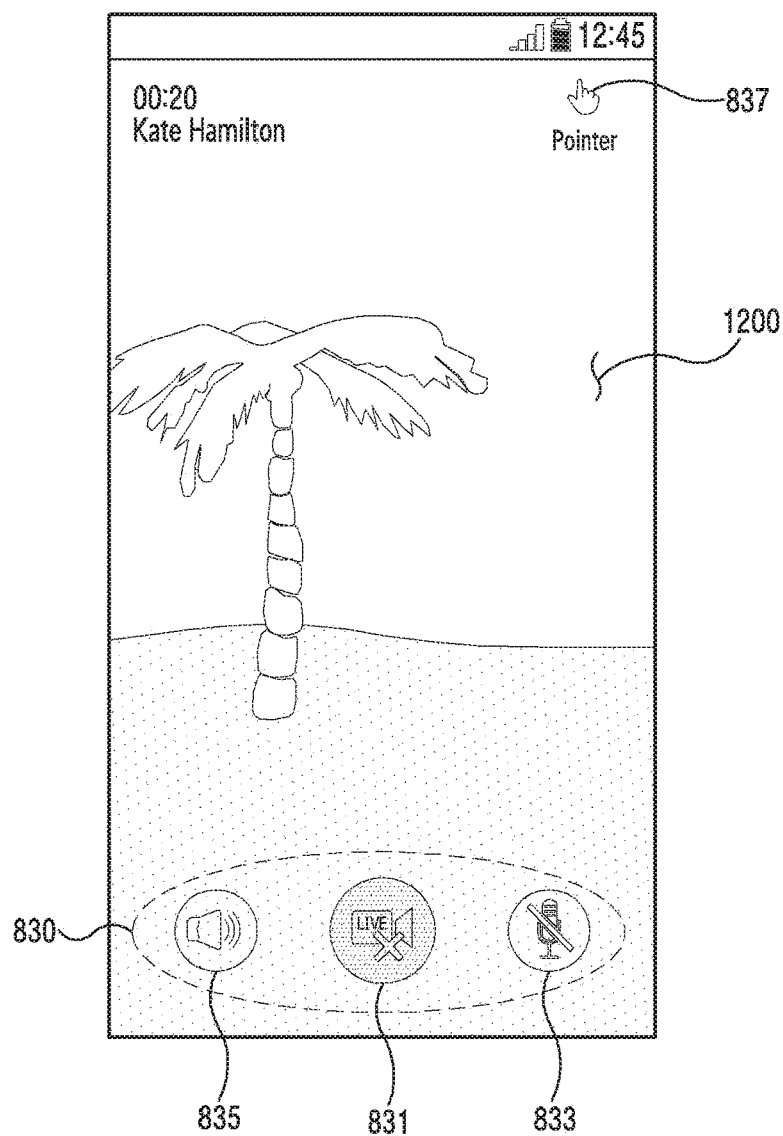

FIGS. 11 and 12 are views illustrated for explaining examples of screens in the case of execution of a service by an electronic device according to various embodiments of the present disclosure.

Referring to FIG. 11, FIG. 11 illustrates an example of a screen of a service user interface provided while the electronic device 500 performs a voice call. For example, FIG. 11 illustrates an example of a screen of a service user interface provided in the case of waiting for (or establishing) a service connection for image reception with another electronic device with which the voice call is being performed. In various embodiments, FIG. 11 may illustrate an example of a screen of a reception terminal, that is, the electronic device 500, which receives an image.

As illustrated in FIG. 11, the service user interface may include a second function area 830 corresponding to the function area as described above with reference to FIG. 8, and may include a preview area 1100. According to various embodiments, FIG. 11 may illustrate an example of a screen in the state of waiting for image reception according to a service connection. In the present example, the electronic device 500 may black-out-process preview area 1100 and provide the same, and may provide the preview area 1100 with at least one of objects (e.g., an item (e.g., an animation icon) notifying of a progress state and text (e.g., Preparing video image . . . . This may take a few seconds due to the network delays.)) notifying thereof) notifying a user that the electronic device 500 is waiting for reception of an image from the another electronic device.

According to various embodiments, when a service connection request is received from the another electronic device while performing the voice call with the another electronic device, the electronic device 500 may notify the user of the reception of the service connection request on the basis of a pop-up window and the like, and may receive an input for allowing whether a service connection is established. When a service connection is allowed by the user, the electronic device 500 may display an image, transmitted by the another electronic device, on the screen thereof.

Referring to FIG. 12, FIG. 12 may illustrate an example of a screen of a service user interface through which the electronic device 500 provides an image received from the another electronic device according to a service connection while performing the voice call. In various embodiments, FIG. 12 may illustrate an example of a screen of a reception terminal, that is, the electronic device 500, which receives an image.

As illustrated in FIG. 12, the service user interface may include a preview area 1200 and may include a second function area 830 corresponding to the function area as described above with reference to FIG. 8. According to various embodiments, in the electronic device 500 that receives an image, the first function area 810 as described above with reference to FIG. 8 may be omitted. In various embodiments, the image displayed on the preview area 1200 may be identical to an image displayed on a preview area (e.g., the preview area 800 of FIG. 8) of the another electronic device.

According to various embodiments, when a service connection for image transmission/reception (image sharing) is established during a voice call between the electronic devices (the first and second electronic devices 610 and 620), user interfaces of an origination terminal transmitting an image and a reception terminal receiving an image may be provided such that the user interfaces thereof are distinguished from each other. For example, as illustrated in FIGS. 8 and 12, the user interfaces of the origination terminal and the reception terminal may commonly display images on the preview areas 800 and 1200, and may provide the second function area 830 to a partial area of each of the preview areas 800 and 1200. Additionally or alternatively, in contrast to the user interface of the reception terminal, the user interface of the origination terminal may further include the first function area 810 for performing storage, selection, configuration change, or the like of an image to be transmitted.

Figure 13:
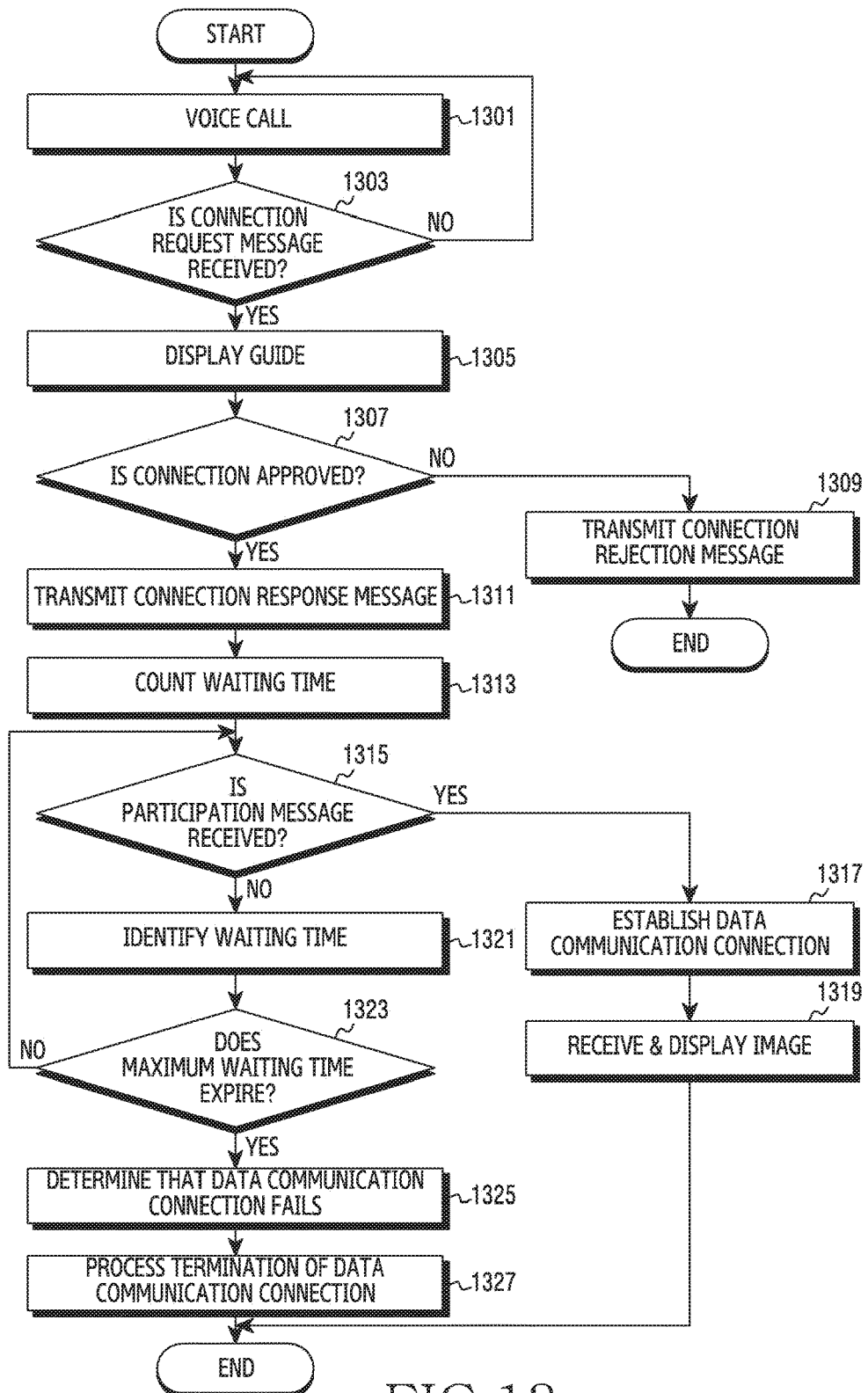
FIG. 13 is a flowchart illustrating a method for performing an image service by an electronic device according to various embodiments of the present disclosure.

FIG. 13 is a flowchart illustrating a method for performing an image service by an electronic device according to various embodiments of the present disclosure.

In various embodiments, FIG. 13 may illustrate an operation of a reception terminal for, while performing a voice call with another electronic device, receiving a service connection request from the another electronic device and receiving an image from the another electronic device when a service connection is established. As an example, FIG. 13 may illustrate a case in which the electronic device 500 operates as a reception terminal.

Referring to FIG. 13, while performing a voice call in operation 1301, in operation 1303, the controller 580 of the electronic device 500 (e.g., a processor of the electronic device operating as a reception terminal) may determine whether a connection request message is received. According to an embodiment, the controller 580 may process a typical operation related to the execution of a voice call with the another electronic device via first communication. While performing a voice call, the controller 580 may determine whether a request for performing an image service is made by the another electronic device.

When no connection request message is received (No in operation 1303), the controller 580 may return to operation 1301 to perform processing related to a voice call, and, upon termination of a voice call with the another electronic device or a user of the another electronic device, may process the termination of the voice call.

When the connection request message is received (Yes in operation 1303), in operation 1305, the controller 580 may process display of a guide, and may determine, in operation 1307, whether a connection request made by the another electronic device is approved or rejected. According to various embodiments, in response to the reception of the connection request message, the controller 580 may output a message notifying a user that the connection request for an image service is made by the another electronic device with which the voice call is being performed, based at least in part on text or a voice. The controller 580 may receive an input for approval or rejection of the connection request, from the user on the basis of the guide.

When the input for the rejection of the connection request is received from the user (No in operation 1307), in operation 1309, the controller 580 may transmit a connection rejection message to the another electronic device. In various embodiments, while maintaining the voice call, the controller 580 may transmit a connection rejection message for rejection of the connection request.

When the input for the approval of the connection request is received from the user (Yes in operation 1307), in operation 1311, the controller 580 may transmit, to the another electronic device, a connection response message corresponding to the connection request message. In various embodiments, the electronic device 500 may be configured to automatically respond to a service connection request. By this configuration, in FIG. 13, operations 1305 and 1307 may be omitted, and, when a connection request message is received from the another electronic with which the voice call is being performed, the controller 580 may proceed to operation 1311 and may automatically transmit a connection response message.

In operation 1313, the controller 580 may count a waiting time. According to various embodiments, after transmitting a connection response message to the another electronic device while performing the voice call with the another electronic device, the controller 580 may determine a waiting time (e.g., the maximum waiting time 680) required to wait for a participation message from the access server 651. In various embodiments, the maximum waiting time may be determined after a connection response message is transmitted by the electronic device 500, or may be predetermined and stored in the electronic device 500. In various embodiments, after transmitting a connection response message, the controller 580 may count the maximum waiting time, and may determine whether a participation message is received for the maximum waiting time.

In operation 1315, the controller 580 may determine whether a participation message is received.

When the participation message is received for the maximum waiting time (Yes in operation 1315), in operation 1317, the controller 580 may establish a data communication connection with the another electronic device. According to various embodiments, when a participation message is received, the controller 580 may determine that a data communication connection is successful, for example, may determine that a service connection, which enables reception of an image from the another electronic device via second communication during a voice call, is established.

In operation 1319, the controller 580 may process reception and display of an image transmitted by the another electronic device. According to various embodiments, during the voice call, the controller 580: may receive an image (e.g., a real-time image or a stored image), which is transmitted by the another electronic device, via the second communication according to the data communication connection, rather than the first communication for a voice call; and may display the same on a preview area.

In operation 1315, when no participation message is received (No in operation 1315), in operation 1321, the controller 580 may identify a waiting time and may determine, in operation 1323, whether the maximum waiting time expires.

When it is determined that the maximum waiting time does not expire (No in operation 1323), the controller 580 may return to operation 1315 and may process executions of operation 1315 and operations following the same.

When it is determined that the maximum waiting time expires (Yes in operation 1323), in operation 1325, the controller 580 may determine that a data communication connection fails. In various embodiments, when no participation message is received for the maximum waiting time, the controller 580 may determine that a service connection, which enables reception of an image from the another electronic device during a voice call, fails. According to various embodiments, when no participation message is received, the controller 580 may determine the relevant case as a condition in which data communication can be performed but data communication quality is poor (which is a state in which data communication cannot be performed, e.g., when the electronic device 500 or the another electronic device is located in a shadow area). According to various embodiments, when it is determined that data communication quality is poor, the controller 580 may determine that a data communication connection (e.g., a service connection for image reception) fails.

In operation 1327, the controller 580 may process termination of a data communication connection. According to various embodiments, while maintaining the voice call being performed via the first communication, the controller 580 may terminate a data communication connection (e.g., a service connection for image reception) for performing second communication. According to various embodiments, when terminating a data communication connection, the controller 580 may process a guide output notifying of the termination of the data communication connection. For example, the controller 580 may output a message notifying the user that a data communication connection cannot be established, on the basis of at least some of a pop-up window, a voice, and a vibration.

Figure 14:
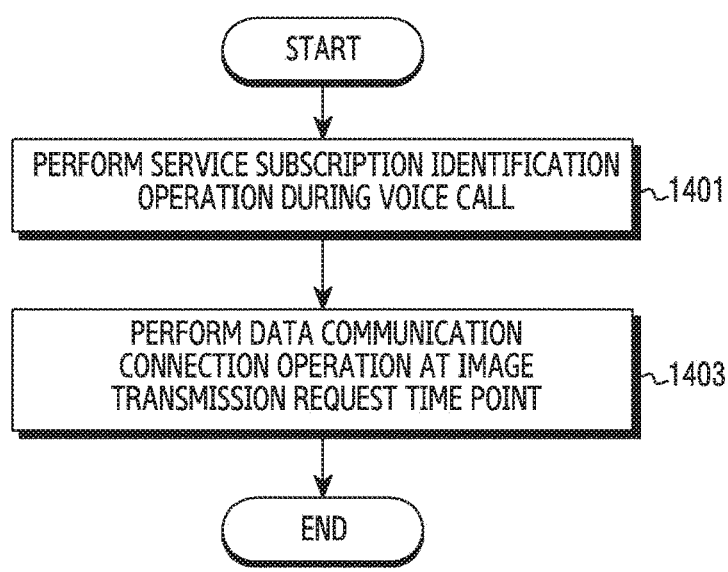
FIG. 14 is a flowchart illustrating a method for performing an image service by an electronic device according to various embodiments of the present disclosure.

FIG. 14 is a flowchart illustrating a method for performing an image service by an electronic device according to various embodiments of the present disclosure.

Referring to FIG. 14, a procedure for a data communication connection (e.g., a P2P connection or a service connection) for an image service in the electronic device 500 (e.g., an origination terminal) according to various embodiments may include: a process (operation 1401) for identifying service subscription; and a process (operation 1403) for establishing a data communication connection (e.g., a P2P connection) for transmitting an image.

In various embodiments, in order to reduce a service connection time, operation 1401, that is, the process for identifying service subscription, may be performed during a voice call or when a voice call is started. In various embodiments, service subscription may be identified based on service subscription information. In various embodiments, service subscription information may be stored in a contact database within the electronic device 500 or a server database. In various embodiments, the electronic device 500 may first identify the contact database therewithin, and, when service subscription is not identified through the contact database, may transmit a service subscription identification request to a server, and may determine whether a reception terminal is in the state of service subscription, on the basis of a response corresponding to the service subscription identification request. The process for identifying service subscription according to various embodiments will be described in detail with reference to FIG. 15.

In various embodiments, operation 1403, that is, the process for establishing a data communication connection, may be performed at a time point when a user actually requests image transmission (e.g., a time point when the user requests execution of a service connection by selecting a service button) during the voice call.

Figure 15:
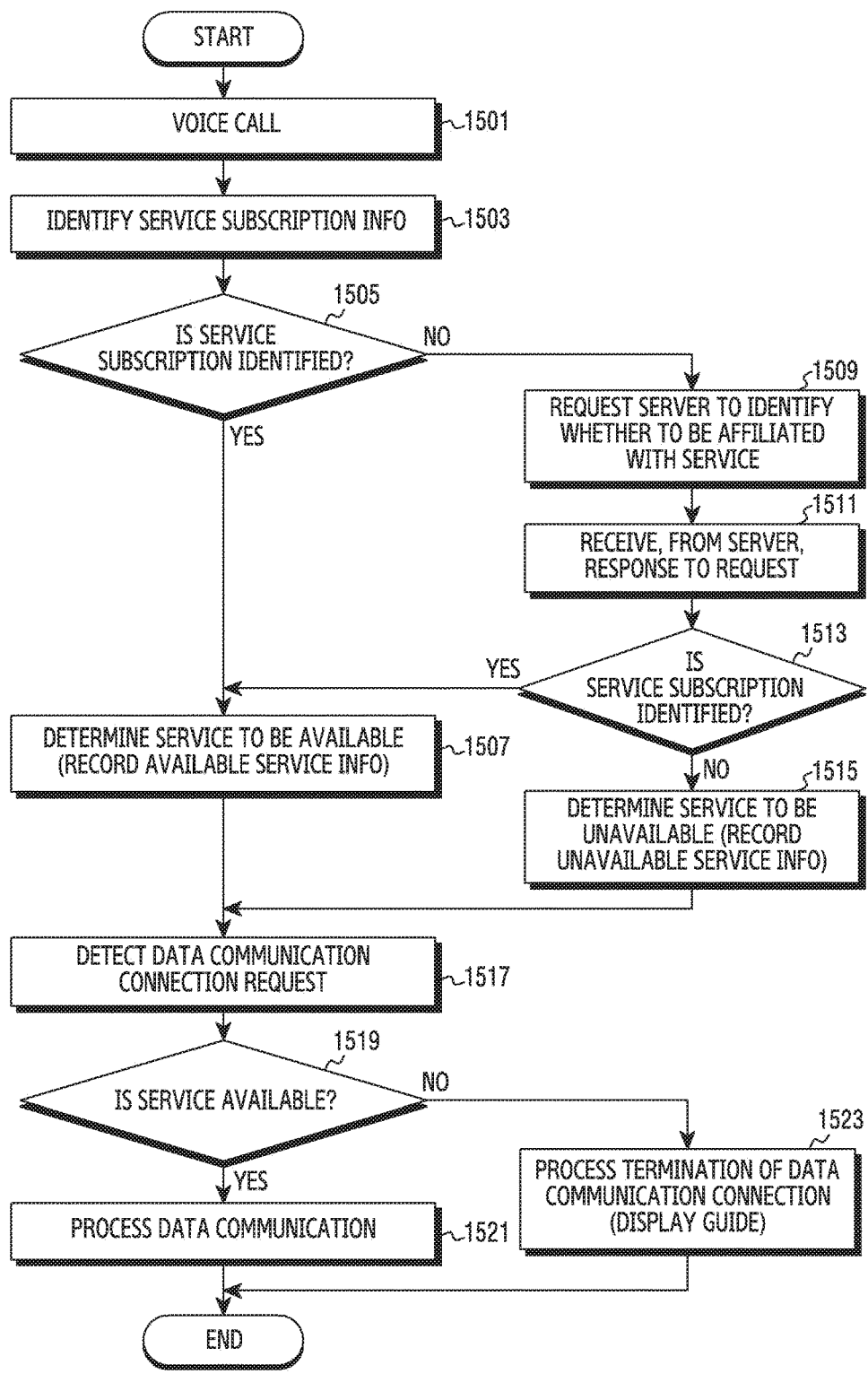
FIG. 15 is a flowchart illustrating a method for performing an image service by an electronic device according to various embodiments of the present disclosure.

FIG. 15 is a flowchart illustrating a method for performing an image service by an electronic device according to various embodiments of the present disclosure.

In various embodiments, FIG. 15 illustrates an operation of identifying service subscription information during a voice call before actual execution of a service connection operation in order to reduce a service connection time.

Referring to FIG. 15, while performing a voice call in operation 1501, in operation 1503, the controller 580 of the electronic device 500 (e.g., a processor of the electronic device operating as an origination terminal) may identify service subscription information. In various embodiments, the controller 580 may identify whether there exists service subscription information (e.g., whether another electronic device is affiliated with a service for image service), on the basis of a contact of the another electronic device, with which the voice call is currently being performed, through a contact database stored (e.g., stored in the memory 550) within the electronic device 500.

In operation 1505, the controller 580 may determine whether service subscription of the another electronic device is identified. In various embodiments, the controller 580 may determine whether service subscription information exists in the contact database, on the basis of a contact of the another electronic device with which the voice call is currently being performed.

When the service subscription of the another electronic device is identified (Yes in operation 1505), in operation 1507, the controller 580 may determine that the service is available between the electronic device 500 and the another electronic device. According to various embodiments, when the another electronic device, with which the voice call is being performed, is affiliated with the service, the controller 580 may determine that a service connection with the another electronic device can be established, and may record available service information for the another electronic device. After operation 1507, the controller 580 may proceed to operation 1517, and may process executions of operation 1517 and operations following the same.

When the service subscription of the another electronic device is not identified through the contact database (No in operation 1505), in operation 1509, the controller 580 may request a server to identify whether the another electronic device is affiliated with the service. For example, the controller 580 may transmit a service subscription identification request message to the server. According to various embodiments, a service subscription identification request message may include information (e.g., a telephone number and unique information) on the another electronic device with which the voice call is currently being performed.

In operation 1511, the controller 580 may receive a response corresponding to the request for identifying whether the another electronic device is affiliated with the service. For example, the controller 580 may receive, from the server, a subscription identification response corresponding to the service subscription identification request message. According to various embodiments, the server may identify service subscription information of the another electronic device through the internal database in response to the service subscription identification request message received from the electronic device 500, may include a result of the identification in the subscription identification response message, and may transmit the subscription identification response message including a result of the identification.

In operation 1513, the controller 580 may determine whether service subscription of the another electronic device is identified. In various embodiments, the controller 580 may determine whether the another electronic device is affiliated with the service (e.g., whether the another electronic device is affiliated with the service for an image service), on the basis of the response (e.g., the subscription identification response message) received from the server.

When the service subscription of the another electronic device is identified (Yes in operation 1513), the controller 580 may proceed to operation 1507, and may process executions of operation 1507 and operations following the same.

When the service subscription of the another electronic device is not identified (No in operation 1513), in operation 1515, the controller 580 may determine that the service is unavailable between the electronic device 500 and the another electronic device. According to various embodiments, when the another electronic device, with which the voice call is being performed, is not affiliated with the service, the controller 580 may determine that a service connection with the another electronic device cannot be established, and may record unavailable service information for the another electronic device. After operation 1515, the controller 580 may proceed to operation 1517, and may process executions of operation 1517 and operations following the same.

In operation 1517, the controller 580 may detect a data communication connection request. According to various embodiments, while performing the voice call with the another electronic device, the controller 580 may receive (detect) a user input through a service button. Upon receiving a user input through the service button, the controller 580 may determine the reception of the user input as a request for establishing a service connection for image transmission with the another electronic device with which the voice call is currently being performed.

In operation 1519, the controller 580 may determine whether the service is available. According to various embodiments, when a data communication connection request is detected, the controller 580 may determine whether the service is available, on the basis of recorded information indicating whether the service is available.

When it is determined that the service is available (Yes in operation 1519), in operation 1521, the controller 580 may process an operation related to data communication. According to an embodiment, when execution of the image service is determined, the controller 580 may operate the camera (e.g., the camera module 570) according to a configuration scheme, and may initiate a service connection operation (e.g., may display a related user interface and may transmit a service connection request) for transmitting an image (e.g., a preview image) acquired through the camera.

When it is determined that the service is unavailable (No in operation 1519), in operation 1523, the controller 580 may process termination of a data communication connection. According to various embodiments, in response to a user's request, the controller 580 may display a guide notifying a user that it is impossible to execute the service between the electronic device 500 and the another electronic device. According to various embodiments, the controller 580 may maintain an operation related to the voice call.

As described above, the electronic device 500 according to various embodiments of the present disclosure may process: performing a voice call with another electronic device via first communication; determining, in response to a service execution request during the voice call, whether a service connection is established, based at least in part on data communication quality and whether it is possible to perform data communication with the another electronic device via second communication; and when the service connection is determined to be established, displaying, on a display, an image acquired through a camera, and transmitting the acquired image to the another electronic device via the second communication.

According to various embodiments, the performing of the voice call may include determining, during the voice call, whether the another electronic device is affiliated with a service. According to various embodiments, the determining of whether the another electronic device is affiliated with the service may include determining whether the another electronic device is affiliated with the service, on the basis of service subscription information of the electronic device.

According to various embodiments, the determining of whether the another electronic device is affiliated with the service may include when whether the another electronic device is affiliated with the service is not identified by the electronic device on the basis of the service subscription information, requesting, by the electronic device, a server to identify whether the another electronic device is affiliated with the service.

According to various embodiments, the determining of whether the service connection is established may include performing, in response to a service execution request, a data communication connection operation for execution of the service between the electronic device and the another electronic device. According to various embodiments, the determining of whether the service connection is established may include: transmitting a connection request message in response to the service connection request; and waiting for reception of a connection response message corresponding to the connection request message, for a determined maximum waiting time. According to various embodiments, the determining of whether the service connection is established may include: when the connection response message is not received for the maximum waiting time, terminating the voice call; and re-establishing a voice and data communication connection via the second communication.

According to various embodiments, the determining of whether the service connection is established may include: transmitting the connection request message when another electronic device is affiliated with the service; and terminating the execution of the service connection when another electronic device is not affiliated with the service.

According to various embodiments, the determining of whether the service connection is established may include waiting for reception of a participation message, for a determined maximum waiting time in response to the reception of the connection response message. According to various embodiments, the determining of whether the service connection is established may include: determining that the service connection fails, when the participation message is not received for the maximum waiting time; and processing termination of the service connection.

The various embodiments disclosed in the present disclosure and the drawings are merely particular embodiments provided to easily describe technical details of the present disclosure and to help the understanding of the present disclosure, and are not intended to limit the scope of the present disclosure. Therefore, it should be construed that the scope of the present disclosure includes all modifications and changes or modified and changed forms, which are derived based on the technical idea of the present disclosure, in addition to the embodiments disclosed herein.

The invention claimed is:

1. An electronic device comprising:
a display;
at least one communication circuit configured to establish wireless communication with an external device by using at least one protocol; and
a processor operatively connected to the display and the at least one communication circuit,
wherein the processor is configured to:
while performing a voice call with the external device, control the display to display a user interface that comprises an indication indicating whether it is possible to perform video communication with the external device,
while performing the voice call, control the at least one communication circuit to transmit a first signal for requesting whether it is possible to perform the video communication with the external device based on a first user input received by the electronic device,
while performing the voice call, control the at least one communication circuit to receive a second signal indicating whether it is possible to perform the video communication,
in response to receiving the second signal while performing the voice call, control the display to adapt the indication that indicates whether it is possible to perform the video communication with the external device based on the second signal,
after adapting the indication, receive a second user input for selecting the indication, and
in response to the second user input, initiate a transmission of video data to the external device.

2. The electronic device of claim 1, wherein the indication comprises at least one of an icon or text.

3. The electronic device of claim 1, wherein the processor is further configured to:
monitor whether it is possible to perform the video communication; and
if it is determined that it is impossible to perform the video communication with the external device, adapt the indication.

4. The electronic device of claim 1, wherein the processor is further configured to:
if it is determined that it is possible to perform the video communication with the external device, control the display to display the indication such that the indication is activated; and
if it is determined that it is impossible to perform the video communication with the external device, control the display to display the indication such that the indication is deactivated.

5. The electronic device of claim 1, wherein the processor is further configured to:
perform the voice call with the external device via a first communication;
in response to a service execution request during the voice call, determine whether a service connection can be established based at least in part on data communication quality and a result of whether it is possible to perform data communication with the external device via a second communication; and
if the service connection is determined to a connection that can be established, control the display to display an image acquired through a camera and control the at least one communication circuit to transmit the acquired image to the external device via the second communication.

6. The electronic device of claim 5, wherein the processor is further configured to determine, during the voice call, whether the external device is affiliated with a service.

7. The electronic device of claim 6, wherein the processor is further configured to:
determine whether the external device is affiliated with the service based on service subscription information of the electronic device; and
if it cannot be determined whether the external device is affiliated with the service based on the service subscription information of the electronic device, request a server to identify whether the external device is affiliated with the service.

8. The electronic device of claim 6, wherein the processor is further configured to, in response to the service execution request, perform a data communication connection for executing the service with the external device.

9. The electronic device of claim 6, wherein the processor is further configured to:
in response to the service execution request, control the at least one communication circuit to transmit a connection request message;
wait for a reception of a connection response message corresponding to the connection request message, for a maximum waiting time;
if the connection response message is not received within the maximum waiting time, terminate the voice call; and
establish a voice and data communication connection via the second communication.

10. The electronic device of claim 9, wherein the processor is further configured to:
if the external device is affiliated with the service, control the at least one communication circuit to transmit the connection request message; and
if the external device is not affiliated with the service, terminate an execution of the service connection.

11. The electronic device of claim 9, wherein the processor is further configured to, in response to the reception of the connection response message, wait for a reception of a participation message for a designated maximum waiting time.

12. The electronic device of claim 11, wherein the processor is further configured to:
   if the participation message is not received within the designated maximum waiting time, determine that the service connection fails; and
   process a termination of the service connection.

13. An operating method of an electronic device, the operating method comprising:
   performing a voice call with an external device via a first communication;
   in response to a service execution request being initiated based on a user input applied to an icon displayed on a display of the electronic device during the voice call, determining whether a service connection can be established with the external device based at least in part on data communication quality and a result of a determination of whether it is possible to perform data communication with the external device via a second communication;
   adapting the icon based on a determination that the service connection can be established with the external device; and
   in response to receiving a second user input applied to the adapted icon, displaying, on the display, an image acquired through a camera of the electronic device and transmitting the image acquired through the camera to the external device via the second communication.

14. The method of claim 13, wherein the performing of the voice call comprises determining, during the voice call, whether the external device is affiliated with a service.

15. The method of claim 14, wherein the determining of whether the external device is affiliated with the service comprises:
   determining whether the external device is affiliated with the service based on service subscription information of the electronic device; and
   if it cannot be determined whether the external device is affiliated with the service based on the service subscription information, requesting, by the electronic device, a server to identify whether the external device is affiliated with the service.

16. The method of claim 14, wherein the determining of whether a service connection can be established further comprises, in response to the service execution request being initiated, performing a data communication connection for executing the service with the external device.

17. The method of claim 15, wherein the determining of whether the service connection can be established further comprises:
   in response to the service execution request being initiated, transmitting a connection request message;
   waiting for a reception of a connection response message corresponding to the connection request message for a designated maximum waiting time;
   if the connection response message is not received within the maximum waiting time, terminating the voice call; and
   establishing a voice and data communication connection via the second communication.

18. The method of claim 17, wherein the determining of whether the service connection can be established further comprises:
   if the external device is affiliated with the service, transmitting the connection request message; and
   if the external device is not affiliated with the service, terminating an execution of the service connection.

19. The method of claim 17, wherein the determining of whether the service connection can be established further comprises, in response to the reception of the connection response message, waiting for a reception of a participation message for the designated maximum waiting time.

20. The method of claim 19, wherein the determining of whether the service connection can be established further comprises:
   if the participation message is not received within the designated maximum waiting time, determining that the service connection fails; and
   processing a termination of the service connection.

* * * * *